US012792319B2

(12) United States Patent
Iyer et al.

(10) Patent No.: US 12,792,319 B2
(45) **Date of Patent: *Nov. 10, 2026**

(54) TRAINING AND USING ARTIFICIAL INTELLIGENCE (AI) / MACHINE LEARNING (ML) MODELS TO AUTOMATICALLY SUPPLEMENT AND/OR COMPLETE CODE OF ROBOTIC PROCESS AUTOMATION WORKFLOWS

(71) Applicant: UiPath, Inc., New York, NY (US)

(72) Inventors: Kartik Iyer, Karnataka (IN); Radhakrishnan Iyer, Karnataka (IN); Naveen Kumar M, Karnataka (IN)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/894,422

(22) Filed: Sep. 24, 2024

(65) Prior Publication Data

US 2025/0013439 A1 Jan. 9, 2025

Related U.S. Application Data

(63) Continuation of application No. 17/528,150, filed on Nov. 16, 2021, now Pat. No. 12,099,820, which is a (Continued)

(30) Foreign Application Priority Data

Oct. 15, 2019 (IN) ............................ 201911041766

(51) Int. Cl.

| | |
|---|---|
| ***G06F 8/36*** | (2018.01) |
| ***G06F 8/34*** | (2018.01) |
| ***G06N 20/00*** | (2019.01) |

(52) U.S. Cl.

CPC .................. *G06F 8/36* (2013.01); *G06F 8/34* (2013.01); *G06N 20/00* (2019.01)

(58) Field of Classification Search

CPC ............. G06Q 10/0633; G06Q 10/103; G06Q 10/067; G06Q 10/06316; G06N 20/00; G06N 3/08

See application file for complete search history.

(56) References Cited

U.S. PATENT DOCUMENTS

| | | | |
|---|---|---|---|
| 5,172,313 | A | 12/1992 | Schumacher |
| 7,356,583 | B2 | 4/2008 | Palmer et al. |

(Continued)

FOREIGN PATENT DOCUMENTS

| | | | |
|---|---|---|---|
| CN | 109791642 | A | 5/2019 |
| EP | 3206170 | A1 | 8/2017 |

(Continued)

OTHER PUBLICATIONS

Office Action, issued Jun. 12, 2025, CN Patent Application No. 202080072312.7.

(Continued)

*Primary Examiner* — Scott L Jarrett

(74) *Attorney, Agent, or Firm* — LeonardPatel PC; Michael A. Leonard, II; Sheetal S. Patel

(57) ABSTRACT

Training and using artificial intelligence (AI)/machine learning (ML) models to automatically supplement and/or complete code of RPA workflows is disclosed. A trained AI/ML model may intelligently and automatically predict and complete the next series of activities in RPA workflows (e.g., one, a few, many, the remainder of the workflow, etc.). Actions users take while creating workflows over a time period may be captured and stored. The AI/ML model may then be trained and used to match the stored actions with stored workflow sequences of actions in order to predict and (Continued)

complete the workflow. As more and more workflow sequences are captured and stored over time, the AI/ML model may be retrained to predict a larger number of sequences and/or to more accurately make predictions. Auto-completion may occur in real-time in some embodiments to save time and effort by the user.

20 Claims, 20 Drawing Sheets

Related U.S. Application Data continuation-in-part of application No. 16/702,966, filed on Dec. 4, 2019, now Pat. No. 11,200,539.

(56) References Cited

U.S. PATENT DOCUMENTS

| | | | | |
|---|---|---|---|---|
| 8,266,585 | B2 | 9/2012 | Funtò et al. | |
| 8,321,251 | B2 | 11/2012 | Opalach et al. | |
| 8,448,089 | B2 | 5/2013 | Li et al. | |
| 8,639,555 | B1 | 1/2014 | Johnston | |
| 8,904,355 | B2 | 12/2014 | Channamsetti et al. | |
| 9,063,764 | B2 | 6/2015 | Gardner | |
| 9,116,672 | B2 | 8/2015 | Muir | |
| 9,436,507 | B2 | 9/2016 | Mishra et al. | |
| 9,760,848 | B2 * | 9/2017 | Farmer | G06Q 10/06 |
| 9,811,352 | B1 | 11/2017 | Sharifi et al. | |
| 9,817,967 | B1 | 11/2017 | Shukla et al. | |
| 10,013,238 | B2 | 7/2018 | Vandikas et al. | |
| 10,013,656 | B1 | 7/2018 | Ciarlini et al. | |
| 10,339,027 | B2 | 7/2019 | Garcia et al. | |
| 10,365,799 | B2 | 7/2019 | Hosbettu et al. | |
| 10,466,863 | B1 | 11/2019 | Guy | |
| 10,476,971 | B2 | 11/2019 | Holmes-Higgin et al. | |
| 10,607,165 | B2 | 3/2020 | Punera et al. | |
| 10,678,874 | B2 | 6/2020 | Mukherjee et al. | |
| 10,812,627 | B2 | 10/2020 | Berg et al. | |
| 11,200,539 | B2 * | 12/2021 | Lyer | G06Q 10/0633 |
| 11,429,351 | B2 | 8/2022 | Nayak et al. | |
| 11,440,201 | B2 | 9/2022 | Singh et al. | |
| 11,880,793 | B2 | 1/2024 | Cho et al. | |
| 12,099,820 | B2 * | 9/2024 | Lyer | G06F 8/34 |
| 2004/0243977 | A1 | 12/2004 | Shou et al. | |
| 2004/0260591 | A1 | 12/2004 | King | |
| 2005/0066304 | A1 | 3/2005 | Tattrie et al. | |
| 2005/0234698 | A1 | 10/2005 | Pinto et al. | |
| 2006/0074730 | A1 | 4/2006 | Shukla et al. | |
| 2006/0136490 | A1 | 6/2006 | Aggarwal et al. | |
| 2007/0276714 | A1 | 11/2007 | Beringer | |
| 2009/0199123 | A1 | 8/2009 | Albertson et al. | |
| 2010/0083225 | A1 | 4/2010 | Giat | |
| 2010/0269032 | A1 | 10/2010 | King et al. | |
| 2011/0078426 | A1 | 3/2011 | Stoitsev | |
| 2012/0323827 | A1 | 12/2012 | Lakshmanan et al. | |
| 2013/0073994 | A1 | 3/2013 | Liao et al. | |
| 2013/0152038 | A1 | 6/2013 | Lim et al. | |
| 2013/0179208 | A1 | 7/2013 | Chung et al. | |
| 2014/0229214 | A1 * | 8/2014 | Bernier | G06Q 10/0633 705/7.16 |
| 2014/0310053 | A1 * | 10/2014 | Liu | G06Q 10/0633 705/7.27 |
| 2014/0350994 | A1 | 11/2014 | Lakshmanan et al. | |
| 2016/0062745 | A1 * | 3/2016 | Rao | G06F 8/33 717/109 |
| 2016/0188298 | A1 | 6/2016 | Vandikas et al. | |
| 2017/0039040 | A1 | 2/2017 | Nayak et al. | |
| 2017/0109636 | A1 | 4/2017 | Marcu et al. | |
| 2017/0109639 | A1 | 4/2017 | Marcu et al. | |
| 2017/0109640 | A1 | 4/2017 | Marcu et al. | |
| 2017/0109676 | A1 * | 4/2017 | Marcu | G06F 11/368 |
| 2018/0046956 | A1 | 2/2018 | Marcu et al. | |
| 2018/0241881 | A1 | 8/2018 | Li et al. | |
| 2018/0294059 | A1 | 10/2018 | Savant et al. | |
| 2019/0026634 | A1 | 1/2019 | Homeyer et al. | |
| 2019/0108470 | A1 | 4/2019 | Jain | |
| 2019/0155225 | A1 | 5/2019 | Kothandaraman et al. | |
| 2019/0205792 | A1 | 7/2019 | Huang | |
| 2019/0220331 | A1 | 7/2019 | Duggal et al. | |
| 2019/0250891 | A1 | 8/2019 | Kumar et al. | |
| 2019/0317803 | A1 * | 10/2019 | Maheshwari | G06F 16/221 |
| 2019/0324781 | A1 | 10/2019 | Ramamurthy et al. | |
| 2021/0042338 | A1 | 2/2021 | Smutko et al. | |
| 2021/0103798 | A1 | 4/2021 | Neagovici et al. | |
| 2021/0110345 | A1 | 4/2021 | Iyer et al. | |
| 2021/0165639 | A1 | 6/2021 | Iyer et al. | |
| 2022/0075605 | A1 | 3/2022 | Iyer et al. | |
| 2022/0113703 | A1 | 4/2022 | Singh | |

FOREIGN PATENT DOCUMENTS

| | | | |
|---|---|---|---|
| JP | 2005173671 | A | 6/2005 |
| JP | 2017004480 | A | 1/2017 |
| JP | 2017142798 | A | 8/2017 |
| JP | 2018205897 | A | 12/2018 |
| WO | 2016170618 | A1 | 10/2016 |
| WO | 2019135835 | A1 | 7/2019 |

OTHER PUBLICATIONS

Search Report, issued Jun. 12, 2025, CN Patent Application No. 202080072312.7.

Notification of Reasons for Refusal, issued Feb. 21, 2025, JP Patent Application No. 2022-520187.

Office Action, issued Nov. 28, 2024, CN Patent Application No. 202080072312.7.

Search Report, issued Nov. 28, 2024, CN Patent Application No. 202080072312.7.

"Autocompletion with deep learning," TabNine web article available at https://tabnine.com/blog/deep/ (Jul. 15, 2019).

AI—the new black? The final frontier of productivity UiPath, 2017 (Year: 2017).

Automation Anywhere Enterprise Development Client User Guide Automation Anywhere, Jun. 28, 2017 (Year: 2017).

Bruch, Marcel et al., Learning from Examples to Improve Code Completion System Proceedings of the 7th join meeting of the European Software Engineer Conference and the ACM Symposium on the Foundations of Software Engineering, 2009 (Year: 2009).

Confidence Intervals for Machine Learning available at https://machinelearningmastery.com/confidence-intervals-for-machine-learning/ (Aug. 8, 2019).

Extended European Search Report issued in EP Application No. 20877736.7 on Aug. 28, 2023.

Final Office Action issued in U.S. Appl. No. 16/702,966 on Jun. 4, 2021.

First Examination Report issued in Indian Application No. 202217022176 on Jun. 28, 2023.

Gao, Junxiong et al., Automated Robotic Process Automation: A Self-Learning Approach Part of the Lecture Notes in Computer Science book series (LNCS, vol. 11877), Oct. 11, 2019 (Year: 2019).

Google Classification Thresholding Crash Course available at https://web.archive.org/web/20190523163343/https://developers.google.com/machine-learning/crash-course/classification/thresholding (May 23, 2019).

International Search Report and Written Opinion of the International Search Authority issued in PCT Application No. PCT/US2020/048512 on Dec. 10, 2020.

Luo, Chu, A Report on Automatic Code Completion Nanyang Technological University, Mar. 2017 (Year: 2017).

Notification of Reasons for Refusal, issued Jun. 11, 2024, Japanese Patent Application No. 2022-520187.

PyTorch Beginners Tutorial for Training a Classifier available at https://web.archive.org/web/20170328045030/https://pytorch.org/tutorials/beginner/blitz/cifar10_tutorial.html (Mar. 28, 2017).

Real RPA: A Trump Card for Work Style Reform.

SAP Process Mining by celonis 4.2 - manual Celnois SE, 2017 (Year: 2017).

(56) References Cited

OTHER PUBLICATIONS

Scott L Jarrett, "Final Office Action", issued Jun. 3, 2024, U.S. Appl. No. 17/528,150.
Scott L Jarrett, "Non-Final Office Action", issued Feb. 24, 2021, U.S. Appl. No. 16/702,966.
Scott L Jarrett, "Non-Final Office Action", issued Mar. 6, 2024, U.S. Appl. No. 17/528,150.
Scott L Jarrett, "Notice of Allowance", issued Jul. 8, 2024, U.S. Appl. No. 17/528,150.
Scott L Jarrett, "Notice of Allowance", issued Sep. 30, 2021, U.S. Appl. No. 16/702,966.
Svyatkovskiy, Alexey et al., Pythia: AI-assisted Code Completion System KDD'19, ACM, Aug. 2019 (Year: 2019).
Visualizing Machine Learning Thresholds to Make Better Business Decisions available at https://blog.insightdatascience.com/visualizing-machine-learning-thresholds-to-make-better-business-decisions-4ab07f823415 (Oct. 9, 2015).
Office Action, issued Nov. 18, 2025, KR Patent Application No. 10-2022-7010805.
Office Action, issued Nov. 7, 2025, CN Patent Application No. 202080072312.7.
Rejection Decision, issued Mar. 16, 2026, CN Patent Application No. 202080072312.7.

* cited by examiner

800

830

| Name | Variable type | Scope | Default |
|---|---|---|---|
| form_details | DataTable | Sequence | *Enter a VB expression* |
| results | DataTable | Sequence | *Enter a VB expression* |

FIG. 13A

1300

```
"Sequence_1">
  <Sequence.Variables>
    <Variable x:TypeArguments="sd:DataTable" Name="results" />
    <Variable x:TypeArguments="sd:DataTable" Name="form_details" />
  </Sequence.Variables>
  <sap:WorkflowViewStateService.ViewState>
    <scg:Dictionary x:TypeArguments="x:String, x:Object">
      <x:Boolean x:Key="IsExpanded">True</x:Boolean>
    </scg:Dictionary>
  </sap:WorkflowViewStateService.ViewState>
  <Assign sap:VirtualizedContainerService.HintSize="433.6,60" sap2010:WorkflowViewState.IdRef=
  "Assign_1">
    <Assign.To>
      <OutArgument x:TypeArguments="sd:DataTable">[results]</OutArgument>
    </Assign.To>
    <Assign.Value>
      <InArgument x:TypeArguments="sd:DataTable">[form_details]</InArgument>
    </Assign.Value>
  </Assign>
  <ui:ExcelApplicationScope Password="{x:Null}" DisplayName="Excel Application Scope"
  sap:VirtualizedContainerService.HintSize="433.6,290.4" sap2010:WorkflowViewState.IdRef=
  "ExcelApplicationScope_1" InstanceCachePeriod="3000" WorkbookPath="Form Details.xlsx">
    <ui:ExcelApplicationScope.Body>
      <ActivityAction x:TypeArguments="ui:WorkbookApplication">
```

FIG. 13B

1310

```
      <ActivityAction.Argument>
        <DelegateInArgument x:TypeArguments="ui:WorkbookApplication" Name="ExcelWorkbookScope" />
      </ActivityAction.Argument>
      <Sequence DisplayName="Do" sap:VirtualizedContainerService.HintSize="375.2,180.8"
      sap2010:WorkflowViewState.IdRef="Sequence_2">
        <sap:WorkflowViewStateService.ViewState>
          <scg:Dictionary x:TypeArguments="x:String, x:Object">
            <x:Boolean x:Key="IsExpanded">True</x:Boolean>
          </scg:Dictionary>
        </sap:WorkflowViewStateService.ViewState>

      </Sequence>
    </ActivityAction>
  </ui:ExcelApplicationScope.Body>
</ui:ExcelApplicationScope>
<ui:LogMessage DisplayName="Log Message" sap:VirtualizedContainerService.HintSize="433.6,92.8"
sap2010:WorkflowViewState.IdRef="LogMessage_1" Level="Info" Message="[&quot;Excel data successfully
written&quot;]" />
</Sequence>
</Activity>
```

FIG. 14A

1400

```
"Sequence_1">
  <Sequence.Variables>
    <Variable x:TypeArguments="sd:DataTable" Name="results" />
    <Variable x:TypeArguments="sd:DataTable" Name="form_details" />
  </Sequence.Variables>
  <sap:WorkflowViewStateService.ViewState>
    <scg:Dictionary x:TypeArguments="x:String, x:Object">
      <x:Boolean x:Key="IsExpanded">True</x:Boolean>
    </scg:Dictionary>
  </sap:WorkflowViewStateService.ViewState>
  <Assign sap:VirtualizedContainerService.HintSize="433.6,60" sap2010:WorkflowViewState.IdRef=
  "Assign_1">
    <Assign.To>
      <OutArgument x:TypeArguments="sd:DataTable">[results]</OutArgument>
    </Assign.To>
    <Assign.Value>
      <InArgument x:TypeArguments="sd:DataTable">[form_details]</InArgument>
    </Assign.Value>
  </Assign>
  <ui:ExcelApplicationScope Password="{x:Null}" DisplayName="Excel Application Scope"
  sap:VirtualizedContainerService.HintSize="433.6,290.4" sap2010:WorkflowViewState.IdRef=
  "ExcelApplicationScope_1" InstanceCachePeriod="3000" WorkbookPath="Form Details.xlsx">
    <ui:ExcelApplicationScope.Body>
      <ActivityAction x:TypeArguments="ui:WorkbookApplication">
```

FIG. 14B

1410

1412

```
        <ActivityAction.Argument>
          <DelegateInArgument x:TypeArguments="ui:WorkbookApplication" Name="ExcelWorkbookScope" />
        </ActivityAction.Argument>
        <Sequence DisplayName="Do" sap:VirtualizedContainerService.HintSize="375.2,180.8"
        sap2010:WorkflowViewState.IdRef="Sequence_2">
          <sap:WorkflowViewStateService.ViewState>
            <scg:Dictionary x:TypeArguments="x:String, x:Object">
              <x:Boolean x:Key="IsExpanded">True</x:Boolean>
            </scg:Dictionary>
          </sap:WorkflowViewStateService.ViewState>
          <ui:ExcelWriteRange AddHeaders="False" DataTable="[results]" DisplayName="Write Range"
          sap:VirtualizedContainerService.HintSize="333.6,88" sap2010:WorkflowViewState.IdRef=
          "ExcelWriteRange_1" SheetName="Sheet1" StartingCell="A1" />
        </Sequence>
      </ActivityAction>
    </ui:ExcelApplicationScope.Body>
  </ui:ExcelApplicationScope>
  <ui:LogMessage DisplayName="Log Message" sap:VirtualizedContainerService.HintSize="433.6,92.8"
  sap2010:WorkflowViewState.IdRef="LogMessage_1" Level="Info" Message="[&quot;Excel data successfully
  written&quot;]" />
 </Sequence>
</Activity>
```

TRAINING AND USING ARTIFICIAL INTELLIGENCE (AI) / MACHINE LEARNING (ML) MODELS TO AUTOMATICALLY SUPPLEMENT AND/OR COMPLETE CODE OF ROBOTIC PROCESS AUTOMATION WORKFLOWS

CROSS-REFERENCE TO RELATED APPLICATION

This application is a continuation of, and claims the benefit of, U.S. Nonprovisional patent application Ser. No. 17/528,150 filed Nov. 16, 2021, which issued as U.S. Pat. No. 12,099,820 on Sep. 24, 2024, which is a continuation-in-part of, and claims the benefit of, U.S. Nonprovisional patent application Ser. No. 16/702,966 filed Dec. 4, 2019, which issued as U.S. Pat. No. 11,200,539 on Dec. 14, 2021, which claims the benefit of Indian patent application Ser. No. 201911041766 filed Oct. 15, 2019. The subject matter of these earlier filed applications is hereby incorporated by reference in its entirety.

FIELD

The present invention generally relates to robotic process automation (RPA), and more specifically, to training and using artificial intelligence (AI)/machine learning (ML) models to automatically supplement and/or complete code of RPA workflows.

BACKGROUND

An RPA workflow may include many modules and/or sequences. When creating workflows for similar tasks, users often tend to repeat certain steps or sequences. Repeating these steps in the workflow takes more developer time and reduces productivity. Existing solutions provide template-driven generation of workflow designs for business automation. However, these templates are preset and do not include intelligence in predicting the user intent or requirements, let alone take into account changes therein. Accordingly, an improved solution that reduces or avoids such repetition during workflow creation may be beneficial.

SUMMARY

Certain embodiments of the present invention may provide solutions to the problems and needs in the art that have not yet been fully identified, appreciated, or solved by current RPA technologies. For example, some embodiments of the present invention pertain to training and using AI/ML models to automatically supplement and/or complete code of RPA workflows.

In an embodiment, a system includes a developer computing system executing an RPA designer application and a model serving server hosting one or more AI/ML models trained to analyze sequences of activities in an RPA workflow as input and provide suggestions of next sequences of activities and respective confidence scores as an output. The RPA designer application is configured to capture a sequence of the activities in an RPA workflow, send the captured sequence of activities to the model serving server, receive one or more suggested next sequences of activities from the one or more trained AI/ML models via the model serving server, and display the one or more suggested next sequences of activities to the developer.

In another embodiment, a non-transitory computer-readable medium stores a computer program including an RPA designer application. The computer program is configured to cause at least one processor to capture a sequence of the activities in an RPA workflow. The captured sequence of activities includes one or more activities that have been added to and/or modified in the RPA workflow by a developer. The computer program is also configured to cause the at least one processor to send the captured sequence of activities to a model serving server, receive one or more suggested next sequences of activities from one or more trained AI/ML models via the model serving server, and display the one or more suggested next sequences of activities to the developer.

In yet another embodiment, a model serving computing system includes memory storing computer program instructions and at least one processor configured to execute the computer program instructions. The computer program instructions are configured to cause the at least one processor to receive a captured sequence of activities in an RPA workflow under development from an RPA designer application of a developer computing system via a communication network, provide the captured sequence of activities as input to one or more trained AI/ML models, receive one or more suggested next sequences of activities and respective confidence scores as an output from the one or more trained AI/ML models, and send the one or more suggested next sequences of activities to the designer computing system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 13A and 13B illustrate a first part and a second part, respectively, of the XAML in an RPA designer application that has been prepared based on activities added and configured by an RPA developer up to a certain point in developing the RPA workflow of FIG. 12, according to an embodiment of the present invention.

FIGS. 14A and 14B illustrate a first part and a second part, respectively, of the XAML for the RPA workflow of FIG. 12 with XAML for a predicted next suitable activity highlighted in grey, according to an embodiment of the present invention.

Unless otherwise indicated, similar reference characters denote corresponding features consistently throughout the attached drawings.

DETAILED DESCRIPTION OF THE EMBODIMENTS

Figure 1:
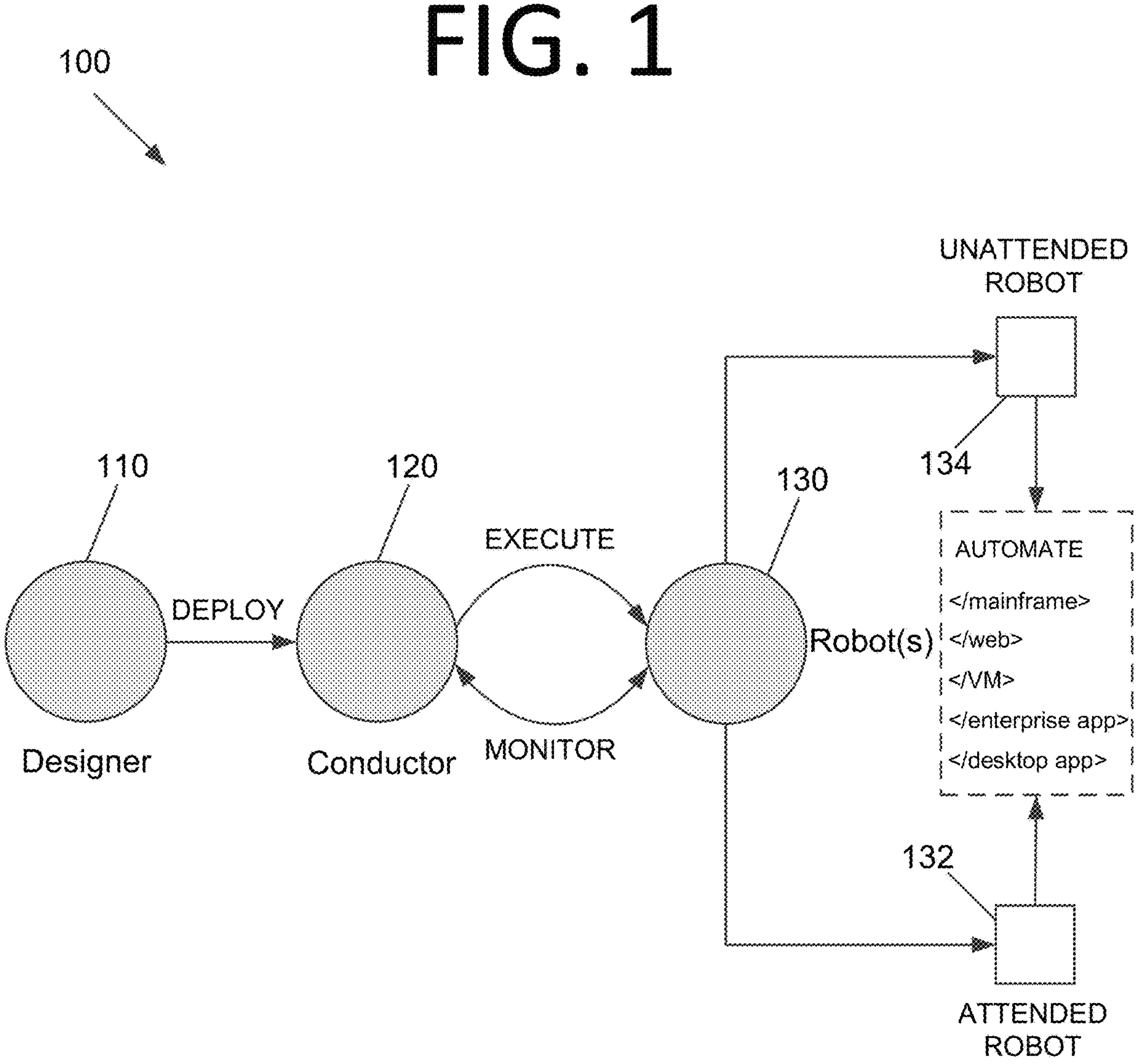
FIG. 1 is an architectural diagram illustrating an RPA system, according to an embodiment of the present invention.

Some embodiments pertain to training and using AI/ML models to automatically supplement and/or complete code of RPA workflows. As used herein, ML may refer to deep learning (DL) (e.g., deep learning neural networks (DLNNs)), shallow learning (e.g., shallow learning neural networks (SLNNs)), any other suitable type of machine learning, sentence transformers, or any combination thereof without deviating from the scope of the invention. Such embodiments may intelligently and automatically predict and complete the next series of activities in RPA workflows (e.g., one, a few, many, the remainder of the workflow, etc.) using ML techniques, or potentially complete the RPA workflow entirely. Activities that users create and/or modify while creating RPA workflows may be captured and stored in a database over a period of time in a suitable format (e.g., extensible application markup language (XAML), JavaScript Object Notation (JSON), XML, plain text, fields in a database, etc.). An ML model (also referred to as an AI/ML model herein) may then be trained on a suitable dataset (e.g., an XAML and/or JSON file dataset) that includes the RPA workflows containing sequences of activities created by RPA developers. Such files may contain the information used to create RPA workflows (e.g., activities, parameters, activity flow, etc.). Example XAML and JSON files for a basic RPA workflow are provided below.

Once the ML model is trained, files (e.g., XAML files) storing information with respect to a workflow that a developer is currently building may be passed by an RPA designer application as input data to the ML model. The ML model may then consume this input and predict one or more potential next sequences of activities for autocompletion, along with a confidence score. If the confidence score(s) exceed a suggestion threshold (e.g., 75%, 90%, etc.), the next sequence(s) may be displayed to the user or completed automatically by the RPA designer application. Autocompletion may have its own, higher threshold in some embodiments (e.g., 95%, 99%, etc.). The format of this predicted output may also be an XAML file in some embodiments. If the current sequence of activities in the workflow does not lead to a prediction of a next sequence of activities with at least a predetermined suggestion confidence threshold (i.e., a suggestion confidence threshold), the RPA designer application may continue to periodically pass the workflow information to the XAML model as the developer continues to create the workflow, and at that point, a suggestion of a next sequence of activities may be provided if the prediction meets the suggestion confidence threshold. Thus, the training data may include incomplete RPA workflows in addition to completed RPA workflows in some embodiments.

Training of a global ML model may occur on the server side so a larger cache of workflow data from multiple or many RPA developers can be stored and analyzed to find patterns. Also, servers tend to have heavy processing and graphical processing unit (GPU) resources, which allows training to occur more rapidly using this machinery. However, training of one or more ML models may occur on the same computing system, on different computing systems, on the client side, on the server side, or on any other computing system(s) and/or location(s) without deviating from the scope of the invention.

In some embodiments, local models may be trained for each RPA developer to take into account individual developer styles and preferences. For example, a developer may prefer to send a certain email after a sequence of activities, may prefer certain variable types, etc. It may be desirable to train local ML models for specific users on their own computing systems, if possible given the hardware resources of the computing system, since that local ML model with user-specific preferences may only be used for that user in some embodiments. Once trained, global and local ML models could be pushed to the RPA developer application or made available to the RPA application remotely (e.g., executed on the server side at the request of the RPA developer application). If no local ML model has been developed for that user, the global ML model can be used. In some embodiments, the local ML model may be applied first, and if no next sequence is predicted (e.g., the confidence threshold for the local model is not met), the global ML model may then be applied to attempt to find a sequence for suggestion. In certain embodiments, the local ML model and the global ML model may have different suggestion confidence thresholds. For instance, the local ML model may be more accurate for a given user than the global ML model, and thus have a lower suggestion threshold, or vice versa.

Because it learns from workflow data from multiple or many RPA developers, the global ML model may be updated less frequently and may take longer to train. The local ML model, on the other hand, uses the workflow data from a given developer. Thus, in some embodiments, the global model may be updated every few weeks, whereas the local model may be updated every few days. Naturally, the speed and frequency with which each model can be trained depends on the given implementation and processing resources.

Once trained, the ML model(s) may receive user confirmation with respect to the auto-created sequences of the RPA workflow in order to complete that portion of the RPA workflow. As more and more RPA workflow sequences are captured and stored over time, the ML model(s) may be retrained to predict a larger number of sequences and/or to more accurately make predictions. Auto-completion may occur in real-time in some embodiments to save time and effort by the developer or other user.

In some embodiments, a developer may start building his or her RPA workflow from scratch. As a step (i.e., an activity) is added to the workflow, the ML model(s) (local, global, or both) may analyze the step, and potentially one or more preceding steps in a sequence, and check whether one or more sequences may potentially be desired following that step that meet at least a predetermined probabilistic suggestion threshold. Once the user adds an activity to the workflow, the last N activities including this newly added activity, or potentially all previous activities, may be considered by the ML model to check whether a next logical sequence of activities can be predicted and autocompleted. This possibility may be determined by the confidence score of the ML model prediction, which may be above 90% in some embodiments. If the confidence score for stored sequences to be suggested based on the current sequence of activities in the workflow is less than the suggestion confidence threshold, then no suggestion may be provided. The ML model may then be run again when the next activity is added until the suggestion confidence threshold is met. Thus, the confidence score(s) for predicted next sequence(s) and the suggestion confidence threshold may be used to determine whether to suggest a given sequence from the ML model.

It is possible that more than one potential next sequences of activities may exceed the suggestion confidence threshold. If this is the case, the user/developer may be presented with these sequences as options to potentially complete one or more next steps in the RPA workflow. In certain embodiments, the sequences are ranked in order of their respective confidence scores. The user/developer may then select the pertinent next sequence, which is automatically added to the workflow. The user may also decline to add any suggested next sequences.

In certain embodiments, adding the selected next sequence of activities may include adding the activities to the RPA workflow, setting declarations and usage of variables (i.e., programming variables), reading from/writing to certain files, and/or any other desired pertinent steps to logically conclude a sequence in an RPA workflow without deviating from the scope of the invention. An RPA workflow, somewhat similar to a programming language, typically has variables of different types that are used during execution of the RPA workflow. If these variables are not declared as a proper datatype, the RPA workflow may run into errors. Thus, correct data types of variables to hold numbers (e.g., Integer), text (e.g., String), etc. should be selected. Thus, some embodiments both perform auto-completion of RPA workflows and internally declare the associated variables of the correct type intelligently.

Per the above, in some embodiments, the ML model provides sequence predictions that meet or exceed a suggestion confidence threshold (i.e., the estimated probability by the ML model that a subsequence will be used following a given step or activity, or sequence thereof). The ML model may learn the confidence score based on training using many workflows as a whole and sequences within these workflows. Also, per the above, if multiple sequences exceed the suggestion confidence threshold for a given step (e.g., at least two logical branches exist since two or more sequences have a confidence score that meets or exceeds the threshold) the developer may be prompted with these sequences. The developer may then choose which sequence is correct (or in some embodiments, indicate that no sequence is correct). If a sequence is selected, the selected sequence is automatically added into the workflow. If not, the developer continues the workflow development process. In some embodiments, over a period of time, the ML model may learn more and more about the developer's personal style, logic, and conventions. The ML model may then use this information to predict and complete the workflow based on how the ML model estimates that the developer would have personally desired. For instance, one developer may prefer to bring screens to the front when entering data to fields therein so that users can see the RPA robot in action whereas another developer may not care whether the screen is visible and may prefer to omit such a step in favor of automation speed, despite both preferences achieving the same result.

In some embodiments, the ML model may be trained via attended feedback, unattended feedback, or both. Attended feedback includes where the developer is actively involved in producing the training data. For instance, the RPA developer may be prompted for reasons why he or she did not want to use the predicted next sequence of activities and provide this to the server side for training. Unattended feedback includes information gleaned without the user's active participation (or potentially, knowledge). For instance, the mere fact that a user has rejected the sequence of activities may provide information that the ML model may not be working as intended for that given user. The activities that the developer includes in the workflow after rejecting the suggestion may then be used to train the model regarding what the developer is actually looking for. If this tends to be the case globally, this information could also be used to train the global ML model.

The attended feedback, unattended feedback, or both, provide input for training the local and global ML models. The global ML model is a generalized model for all RPA developers or a subset of RPA developers, and the local ML model is personalized and user-specific. If the local ML model does not exist or does not find a sequence that meets or exceeds the suggestion confidence threshold, the global ML model may be consulted to attempt to find a suggestion that meets or exceeds the suggestion confidence threshold for prediction. In certain embodiments, more than two ML models may be used. For example, some embodiments may employ a local model for a given developer and then N next models (e.g., programming team, then group, then company, etc.) that apply to increasingly large groups of developers, all the way up to a global model. These ML models may be applied in a sequence in some embodiments (e.g., the ML model that applies to the smallest number of users to that which applies to the largest number).

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable for more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
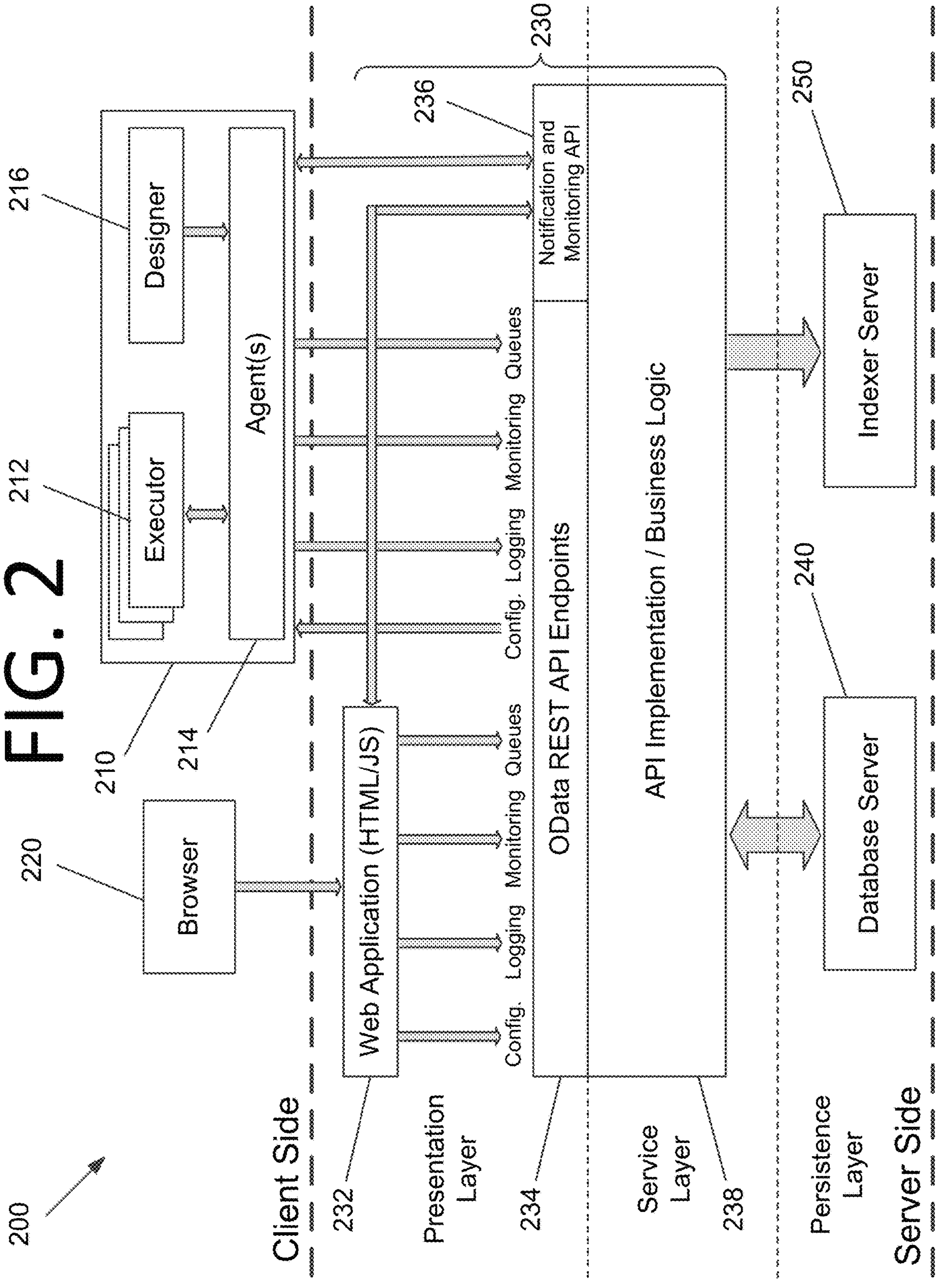
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment-database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
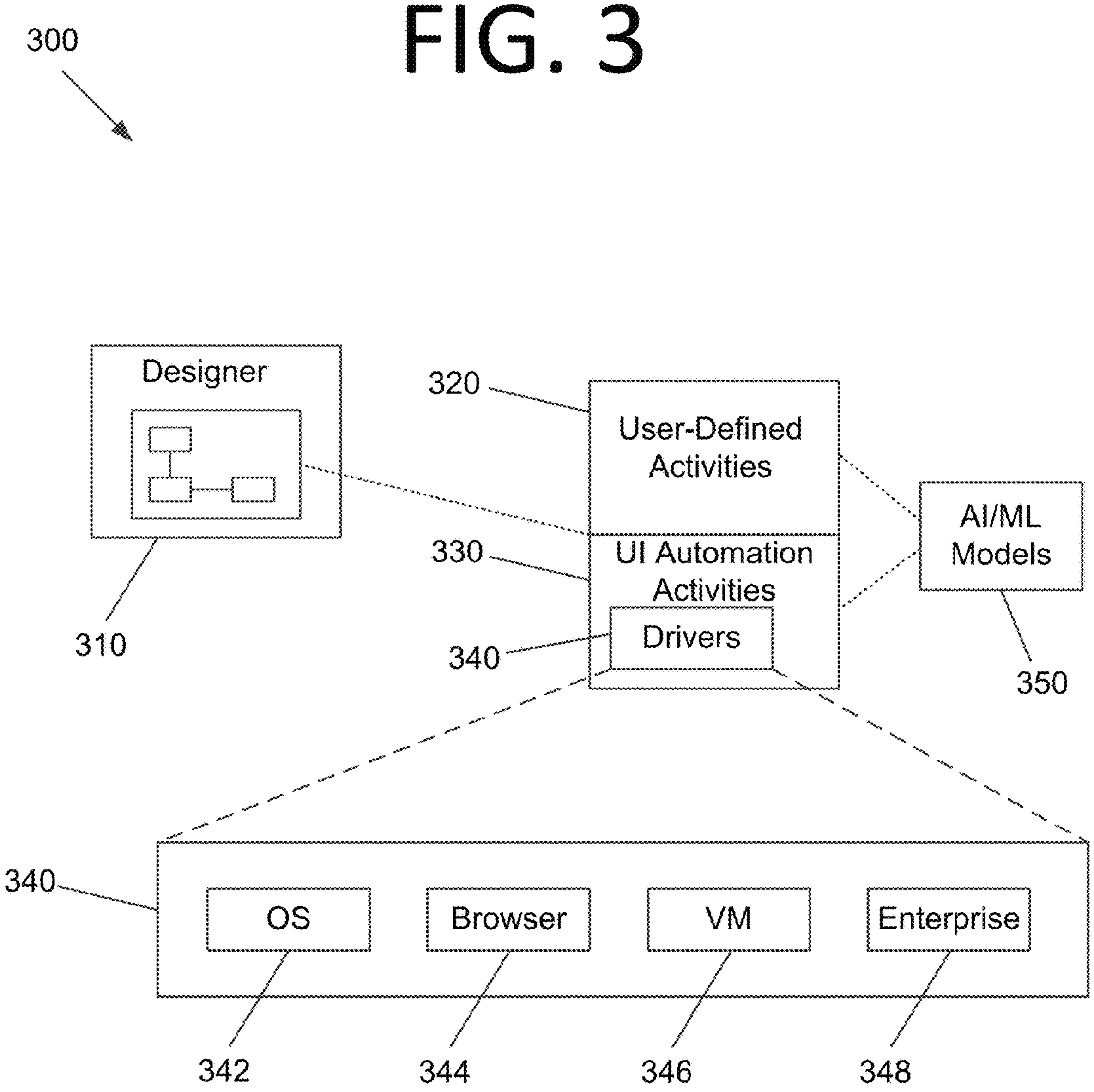
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models 350 that allow the robot to interact with the desired software. One or more of AI/ML models 350 may be used by UI automation activities 330 in order to perform interactions with the computing system. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
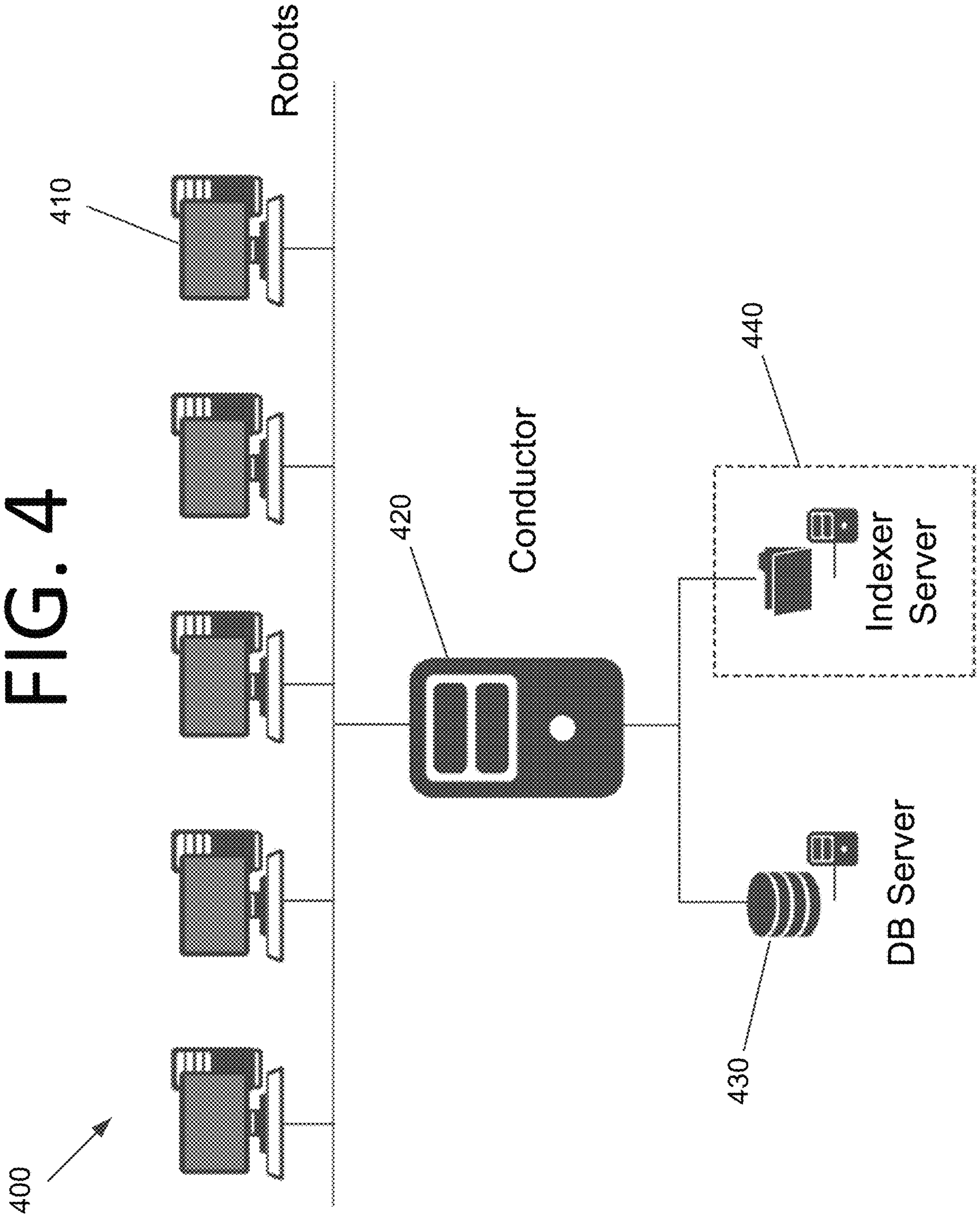
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
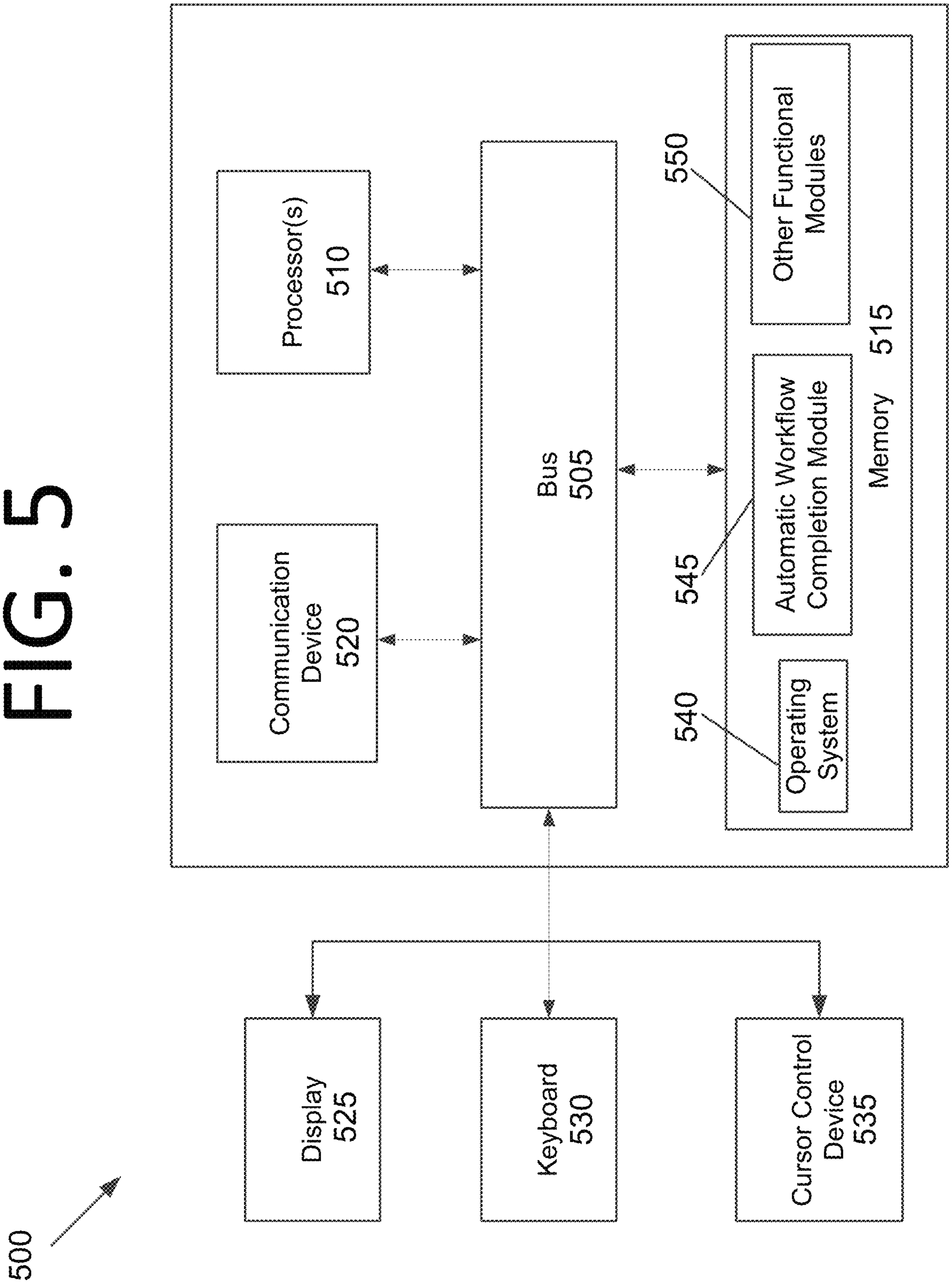
FIG. 5 is an architectural diagram illustrating a computing system configured to train and/or use AI/ML models to automatically supplement and/or complete code of RPA workflows, according to an embodiment of the present invention.

FIG. 5 is an architectural diagram illustrating a computing system 500 configured to train and/or use AI/ML models to automatically supplement and/or complete code of RPA workflows, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an automatic workflow completion module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, or any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6A:
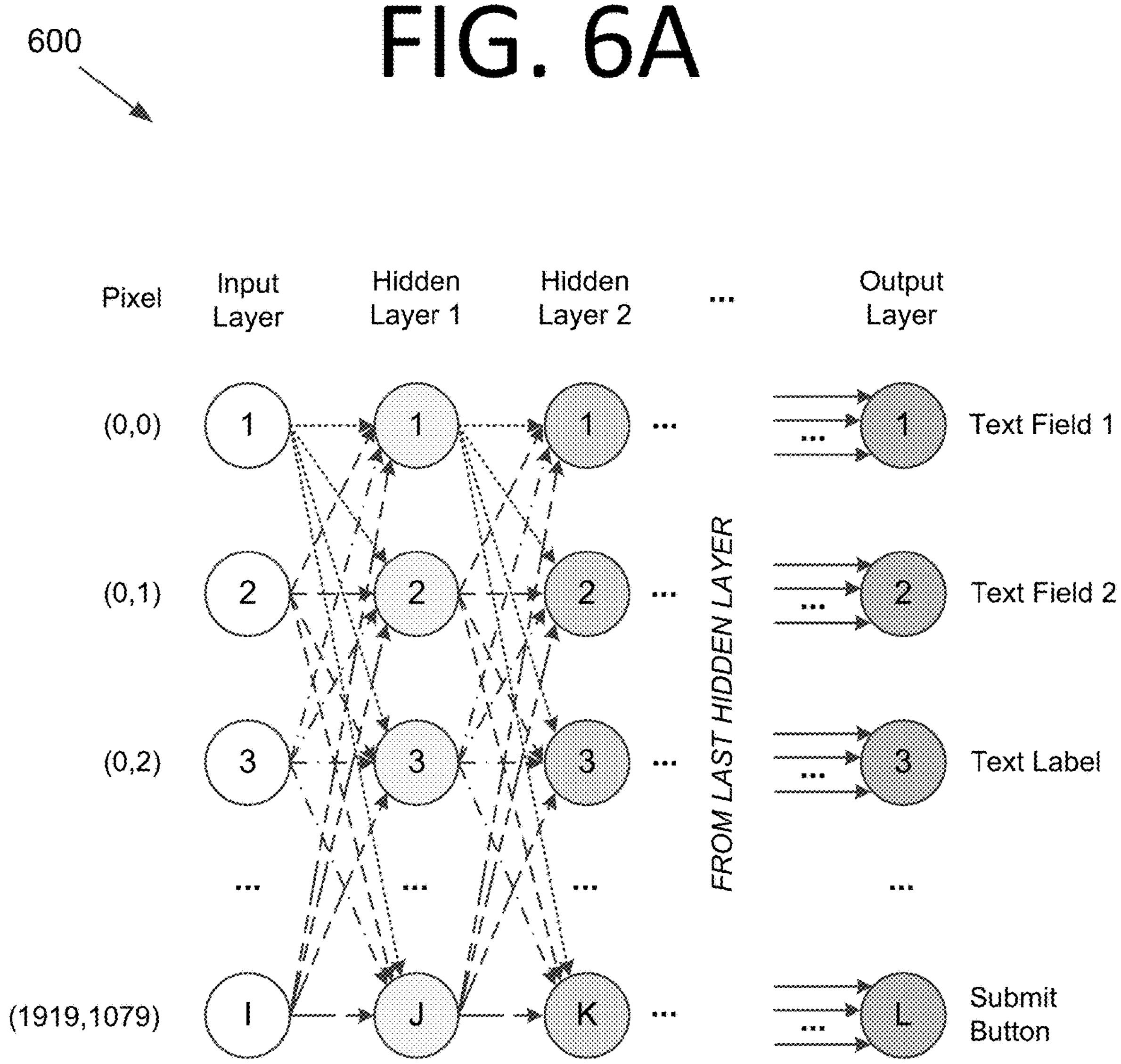
FIG. 6A illustrates an example of a neural network that has been trained to recognize graphical elements in an image, according to an embodiment of the present invention.

FIG. 6A illustrates an example of a neural network 600 that has been trained to recognize graphical elements in an image, according to an embodiment of the present invention. Here, neural network 600 receives pixels of a screenshot image of a 1920×1080 screen as input for input "neurons" 1 to I of the input layer. In this case, I is 2,073,600, which is the total number of pixels in the screenshot image.

Neural network 600 also includes a number of hidden layers. Both DLNNs and SLNNs usually have multiple layers, although SLNNs may only have one or two layers in some cases, and normally fewer than DLNNs. Typically, the neural network architecture includes an input layer, multiple intermediate layers, and an output layer, as is the case in neural network 600.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 6A, pixels provided as the input layer are fed as inputs to the J neurons of hidden layer 1. While all pixels are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. It should be noted that numbers of neurons I, J, K, and L are not necessarily equal, and thus, any desired number of layers may be used for a given layer of neural network 600 without deviating from the scope of the invention. Indeed, in certain embodiments, the types of neurons in a given layer may not all be the same.

Neural network 600 is trained to assign a confidence score to graphical elements believed to have been found in the image. In order to reduce matches with unacceptably low likelihoods, only those results with a confidence score that meets or exceeds a confidence threshold may be provided in some embodiments. For instance, if the confidence threshold is 80%, outputs with confidence scores exceeding this amount may be used and the rest may be ignored. In this case, the output layer indicates that two text fields, a text label, and a submit button were found. Neural network 600 may provide the locations, dimensions, images, and/or confidence scores for these elements without deviating from the scope of the invention, which can be used subsequently by an RPA robot or another process that uses this output for a given purpose.

It should be noted that neural networks are probabilistic constructs that typically have a confidence score. This may be a score learned by the AI/ML model based on how often a similar input was correctly identified during training. For instance, text fields often have a rectangular shape and a white background. The neural network may learn to identify graphical elements with these characteristics with a high confidence. Some common types of confidence scores include a decimal number between 0 and 1 (which can be interpreted as a percentage of confidence), a number between negative ∞ and positive ∞, or a set of expressions (e.g., "low," "medium," and "high"). Various post-processing calibration techniques may also be employed in an attempt to obtain a more accurate confidence score, such as temperature scaling, batch normalization, weight decay, negative log likelihood (NLL), etc.

"Neurons" in a neural network are mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 6B:
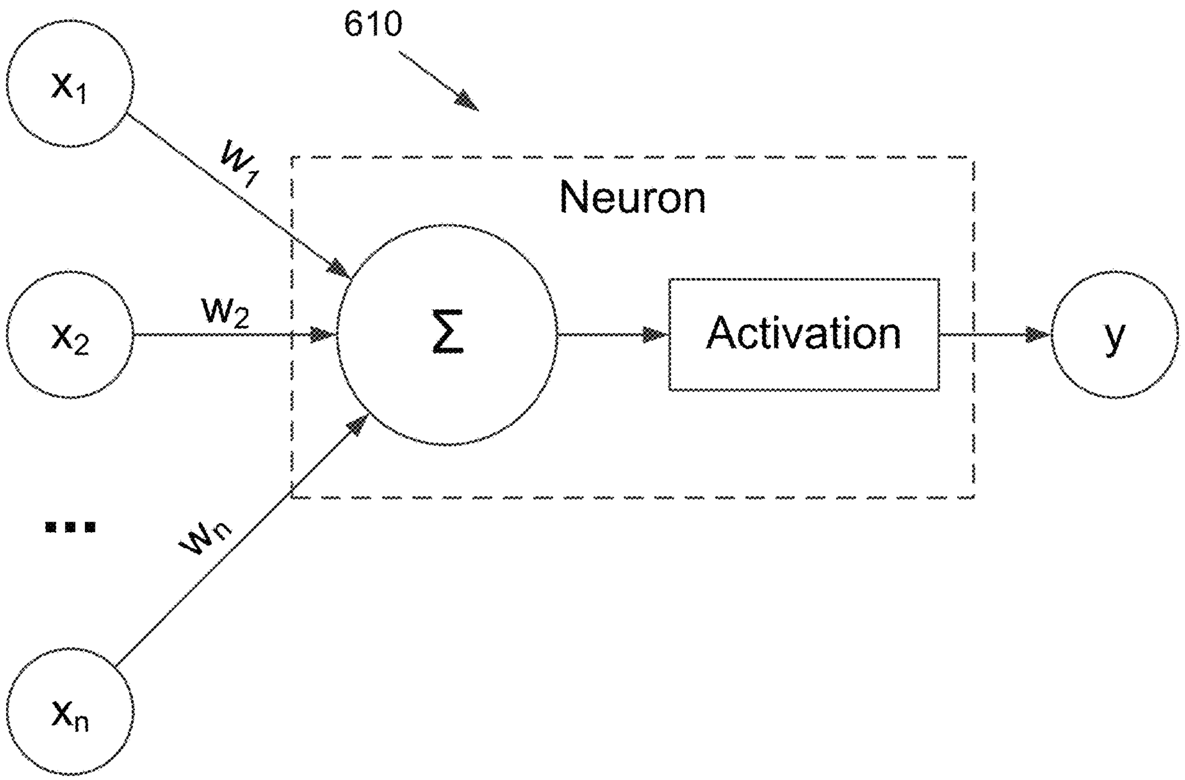
FIG. 6B illustrates an example of a neuron, according to an embodiment of the present invention.

An example of a neuron 610 is shown in FIG. 6B. Inputs $x_1, x_2, \ldots, x_n$ from a preceding layer are assigned respective weights $w_1, w_2, \ldots, w_n$. Thus, the collective input from preceding neuron 1 is $w_1x_1$. These weighted inputs are used for the neuron's summation function modified by a bias, such as:

$$\sum_{i=1}^{m}(w_i x_i) + \text{bias} \tag{1}$$

This summation is compared against an activation function $f(x)$ to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \tag{2}$$

The output y of neuron 710 may thus be given by:

$$y = f(x)\sum_{i=1}^{m}(w_i x_i) + \text{bias} \tag{3}$$

In this case, neuron 610 is a single-layer perceptron. However, any suitable neuron type or combination of neuron types may be used without deviating from the scope of the invention.

A goal, or "reward function," is often employed. In this example, the goal is the successful identification of graphical elements in the image. A reward function explores intermediate transitions and steps with both short term and long term rewards to guide the search of a state space and attempt to achieve a goal (e.g., successful identification of graphical elements, successful identification of a next sequence of activities for an RPA workflow, etc.).

During training, various labeled data (in this case, images) are fed through neural network 600. Successful identifications strengthen weights for inputs to neurons, whereas unsuccessful identifications weaken them. A cost function, such as mean square error (MSE) or gradient descent, may be used to punish predictions that are slightly wrong much less than predictions that are very wrong. If the performance of the AI/ML model is not improving after a certain number of training iterations, a data scientist may modify the reward function, provide indications of where non-identified graphical elements are, provide corrections of misidentified graphical elements, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \ldots f_1(W_1 x + b_1) \ldots ) + b_{N-1}) + b_N) \tag{4}$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o-t. This global error is then propagated backwards giving local errors for weight updates with computations similar to, but not exactly the same as, those used for forward propagation. In particular, the backpropagation step typically requires an activity function of the form $$p_j(n_j) = f_j'(n_j),$$

where $n_j$ is the network activity at layer j (i.e., $n_j=W_j o_{j-1}+b_j$) where $o_j=f_j(n_j)$ and the apostrophe ' denotes the derivative of the activity function $f$.

The weight updates may be computed via the formulae:

$$d_j = \begin{cases} (o-t)\circ p_j(n_j), & j = N \\ W_{j+1}^T d_{j+1}\circ p_j(n_j), & j < N \end{cases} \tag{5}$$

$$\frac{\partial E}{\partial W_{j+1}} = d_{j+1}(o_j)^T \tag{6}$$

$$\frac{\partial E}{\partial b_{j+1}} = d_{j+1} \tag{7}$$

$$W_j^{new} = W_j^{old} - \eta\frac{\partial E}{\partial W_j} \tag{8}$$

$$b_j^{new} = b_j^{old} - \eta\frac{\partial E}{\partial b_j} \tag{9}$$

where $\circ$ denotes a Hadamard product (i.e., the element-wise product of two vectors), $^T$ denotes the matrix transpose, and $o_j$ denotes $f_j W_j o_{j-1}+b_j$), with $o_0=x$. Here, the learning rate η is chosen with respect to machine learning considerations. Below, η is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model is trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model is tested on a set of evaluation data that the AI/ML model has not encountered before. This helps to ensure that the AI/ML model is not "over fit" such that it identifies graphical elements in the training data well, but does not generalize well to other images.

In some embodiments, it may not be known what accuracy level may be achieved. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model.

In certain embodiments, a collection of trained AI/ML models may be used to accomplish a task, such as employing an AI/ML model for each type of graphical element of interest (e.g., one for images, another for text fields, another for radio buttons, etc.), employing an AI/ML model to perform OCR, deploying yet another AI/ML model to recognize proximity relationships between graphical elements, employing still another AI/ML model to generate an RPA workflow based on the outputs from the other AI/ML models, etc. This may collectively allow the AI/ML models to enable semantic automation, for instance. CV and OCR may be performed using convolutional and/or recurrent neural networks (RNNs), for example.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

By way of nonlimiting example, consider a workflow in which a user of an RPA designer application includes sequences for opening a web browser and searching for certain information on the Internet where the browsed webpage contains a table. The user may then add activities to open an Excel® workbook and copy-and-paste this table into an Excel® spreadsheet. In the background, the RPA designer application may track the actions taken by the user as the user creates workflows and consult one or more ML models after each activity or a sequence of activities. If the user tends to include this sequence of activities repeatedly following adding a certain activity, the ML model(s) may learn to predict that the user will likely perform this sequence of actions based on a certain context and beginning activity (e.g., when the user adds an activity that launches a web browser, the user then adds activities to visit the website and copy-and-paste the table into the Excel® spreadsheet).

Once this sequence is learned (e.g., user-specific, common among users in a company, common globally, etc.), upon adding the task to open the web browser, the ML model may indicate that one or more next sequences of activities meet or exceed the suggestion confidence level, and the RPA designer application may prompt the user with the choice to select a next sequence to add to the RPA workflow. Alternatively, in some embodiments, the RPA designer application may automatically add the sequence to the RPA workflow without the user's input when the suggestion confidence threshold is met or exceeded, or select a next sequence with the highest confidence threshold when multiple sequences meet or exceed the suggestion confidence threshold. In still other embodiments, the RPA designer application may prompt the user with the choice to add the learned sequence to the RPA workflow if the confidence level of a next sequence of activities is below a relative certainty threshold but above a suggestion confidence threshold and automatically add the sequence to the workflow without the user's input if the confidence level of the next sequence of activities is at or above the relative certainty threshold. For example, the sequence of the RPA workflow may include automatically adding a workbook path inside the Excel Application scope, dropping a "Write Cell" or "Write Range" activity based on the ML model, rename the sheet as per a convention to suit the current problem, write the results into the Excel® spreadsheet, and drop a "Log Message" activity to write logs regarding the progress. The RPA designer application may complete the workflow automatically when the user clicks an "Enter Key" on the screen, for example. Furthermore, after predicting that the user wishes to write the table in an Excel® spreadsheet, the RPA designer application in this example gives an appropriate name to the file, starting cell, and sheet name, provides variable declarations, provides property declarations, and logs a message to the user regarding whether the operations were successful.

In general, completion of an RPA workflow accomplishing the task of opening Excel®, naming a file, entering a starting cell, entering a sheet name, and declaring the variables takes around 65-75 seconds for an experienced user to complete. To save time in completing these steps, which tend to be generic to Excel® writing operations, the ML model of some embodiments may predict the next sequence of the RPA workflow, a suggestion may be provided to the developer, and the developer may accept the suggestion in 2-3 seconds, depending on computing power of the developer's computing system. This decreases development time by over one minute in this example. Where an RPA developer creates RPA workflows with such a sequence frequently, the savings in development time can be substantial.

If the user/developer is satisfied with the predicted next sequence of activities, this next sequence of activities may be added to the RPA workflow. If user/developer is not satisfied with the predicted next sequence of the RPA workflow provided by the ML model (e.g., the user's personal preferences are different, the user's style of building RPA workflows is different, the business use case requires something else, there is a logical error, etc.), feedback may be given to retrain the ML model. If the feedback is user-specific, the ML model may be retrained for that user's preferences and a custom ML model may be created. Over time, the ML model learns what the user is working on and suggests next sequences of RPA workflows accordingly. If the feedback is not user-specific (e.g., for a global model or a model for a larger group of users than just the individual user), the feedback may be collected with feedback from other users over a period of time, and the ML model may then be retrained to be more accurate for all users or the group of users.

Figure 7:
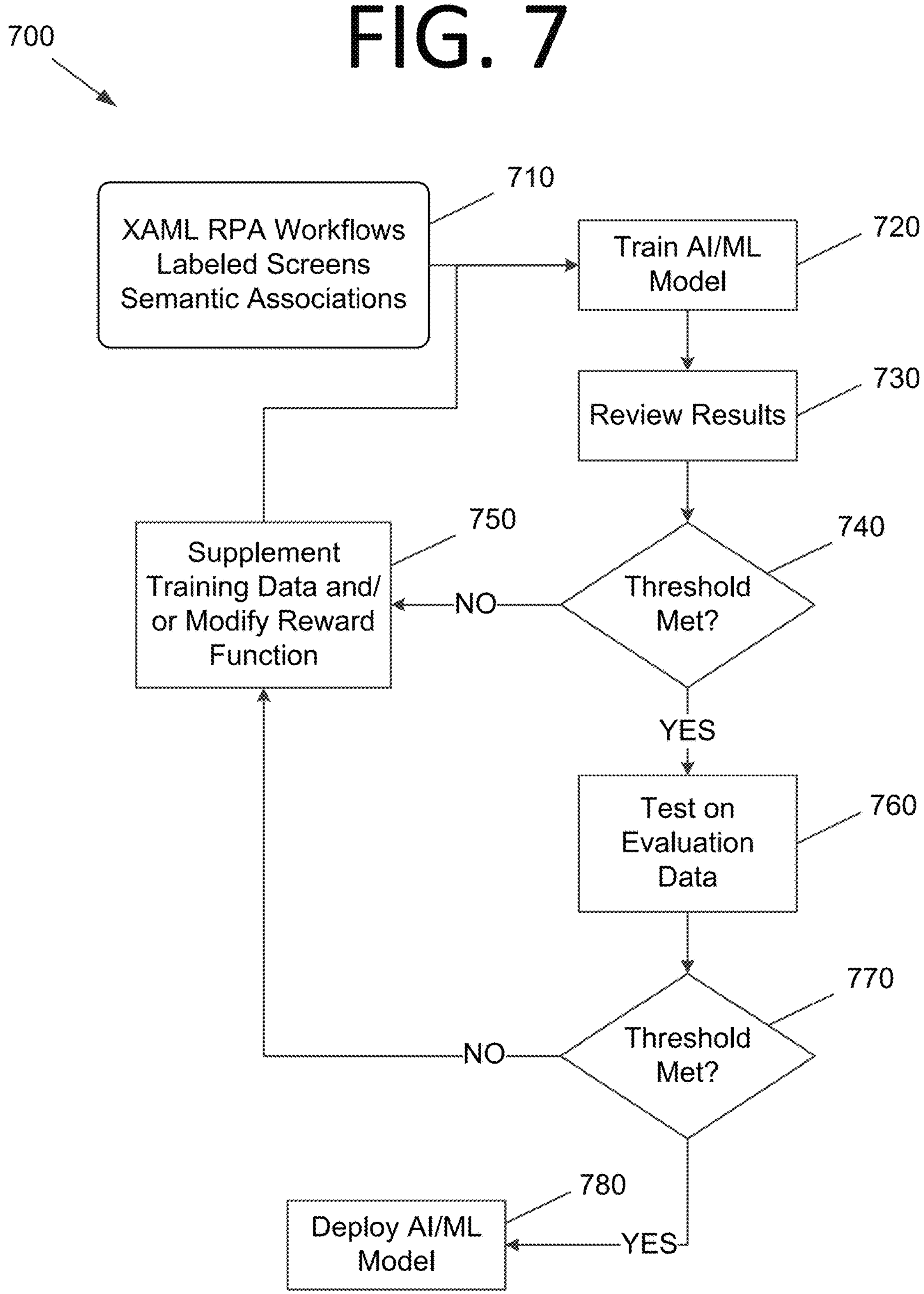
FIG. 7 is a flowchart illustrating a process for training AI/ML model(s) to provide suggestions to automatically add to and/or complete RPA workflows, according to an embodiment of the present invention.

FIG. 7 is a flowchart illustrating a process 700 for training AI/ML model(s) to provide suggestions to automatically add to (i.e., supplement) and/or complete RPA workflows, according to an embodiment of the present invention. The process begins with providing labeled screens (e.g., with graphical elements and text identified), RPA workflows in XAML or any other suitable format for processing, words and phrases, a "thesaurus" of semantic associations between words and phrases such that similar words and phrases for a given word or phrase can be identified, etc. at 710. The AI/ML model is then trained over multiple epochs at 720 and results are reviewed at 730.

If the AI/ML model fails to meet a desired confidence threshold at 740, the training data is supplemented and/or the reward function is modified to help the AI/ML model more effectively achieve its objectives at 750 and the process returns to step 720. If the AI/ML model meets the confidence threshold at 740, the AI/ML model is tested on evaluation data at 760 to ensure that the AI/ML model generalizes well and that the AI/ML model is not overly fit with respect to the training data. The evaluation data may include RPA workflows that the AI/ML model has not processed before, for example. If the confidence threshold is met at 770 for the evaluation data, the AI/ML model is deployed at 780. If not, the process returns to step 750 and the AI/ML model is trained further.

Figure 8A:
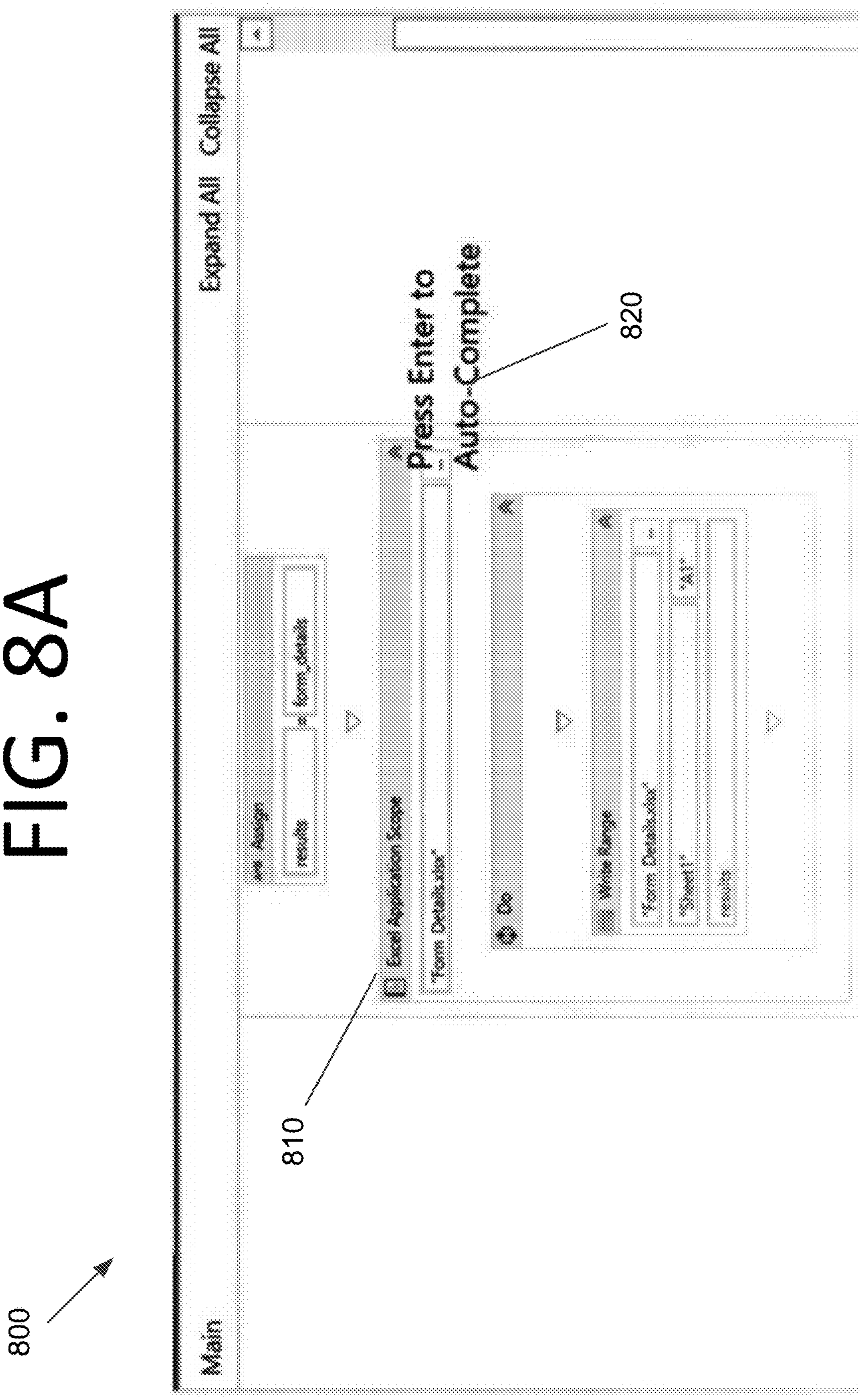
FIG. 8A is a screenshot illustrating an RPA designer application after a potential next sequence of activities has been detected by an ML model, according to an embodiment of the present invention.

FIG. 8A is a screenshot 800 illustrating an RPA designer application 800 after a potential next sequence of activities has been detected by an ML model, according to an embodiment of the present invention. Here, the developer has dropped an Excel® Application Scope activity 810 into the RPA workflow. The ML model, which is run by the RPA designer application in this embodiment, analyzes the logic of the RPA workflow and determines that a subsequent sequence of activities may be desired by the user. The ML model then provides the suggested sequence to the RPA designer application, which displays it to the user with a suggestion to complete the RPA workflow automatically (i.e., providing a "Press Enter to Auto-Complete" prompt 820).

Figure 8B:
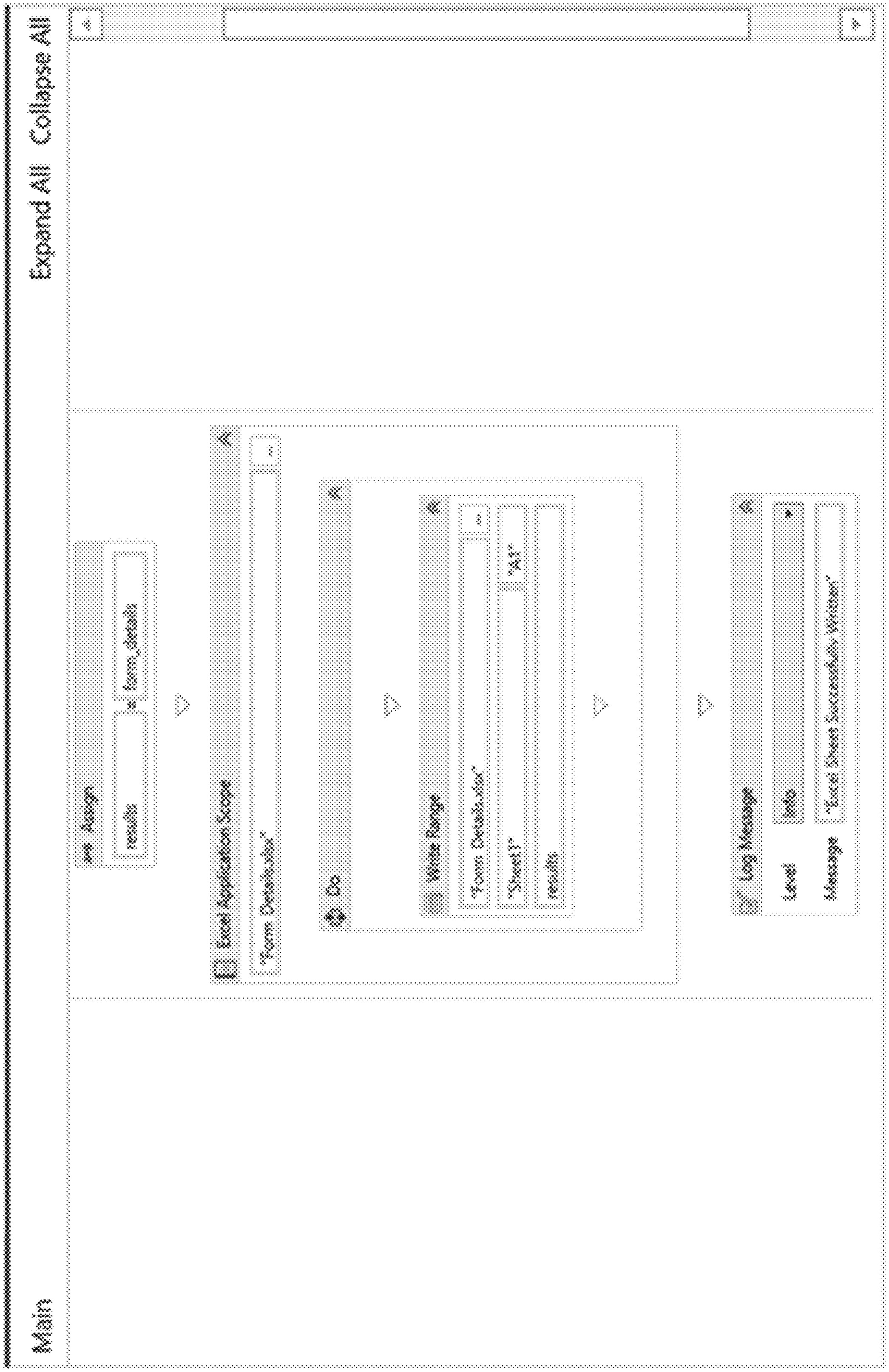
FIG. 8B is a screenshot illustrating the RPA designer application of FIG. 8A after the user has indicated that the suggested next sequence of activities is correct and the sequence has been added to the workflow, according to an embodiment of the present invention.
Figures 8C, 8D:
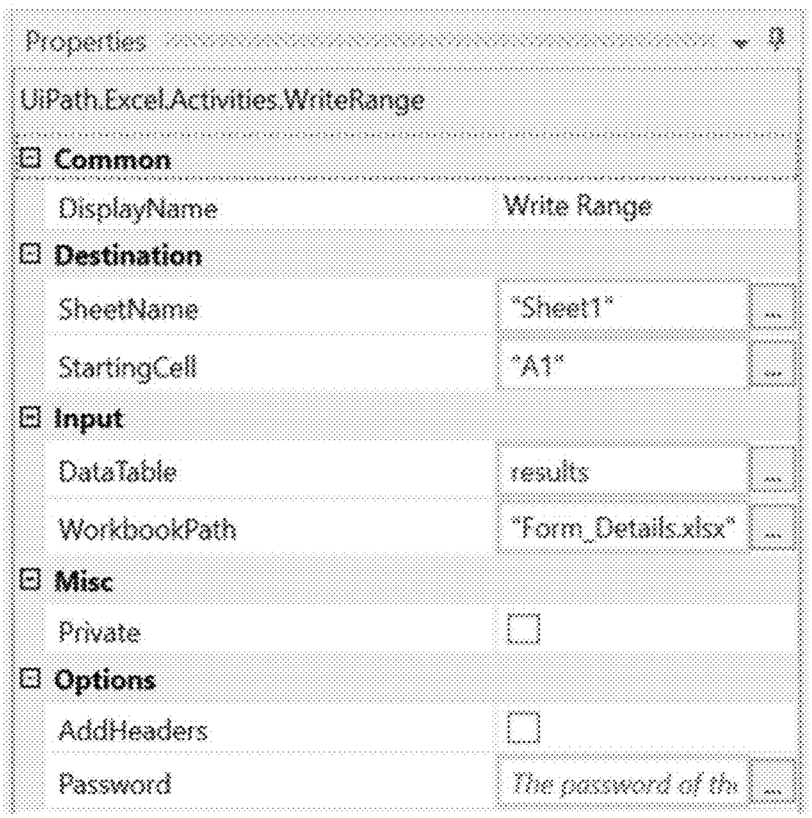
FIG. 8C is a screenshot illustrating an auto-completed variables tab, according to an embodiment of the present invention.
FIG. 8D is a screenshot illustrating an auto-completed properties tab, according to an embodiment of the present invention.

After the developer presses enter, the sequence is automatically added to the RPA workflow, as shown in FIG. 8B. In some embodiments, the sequence may also take into account the developer's personal style and/or preferences. The RPA workflow may not be complete, or the developer can choose to add additional actions to the RPA workflow if further tasks are to be accomplished. Variables and properties are also automatically completed based on the current RPA workflow logic in variables tab 830 (see FIG. 8C) and properties tab 840 (see FIG. 8D), respectively.

Figure 9:
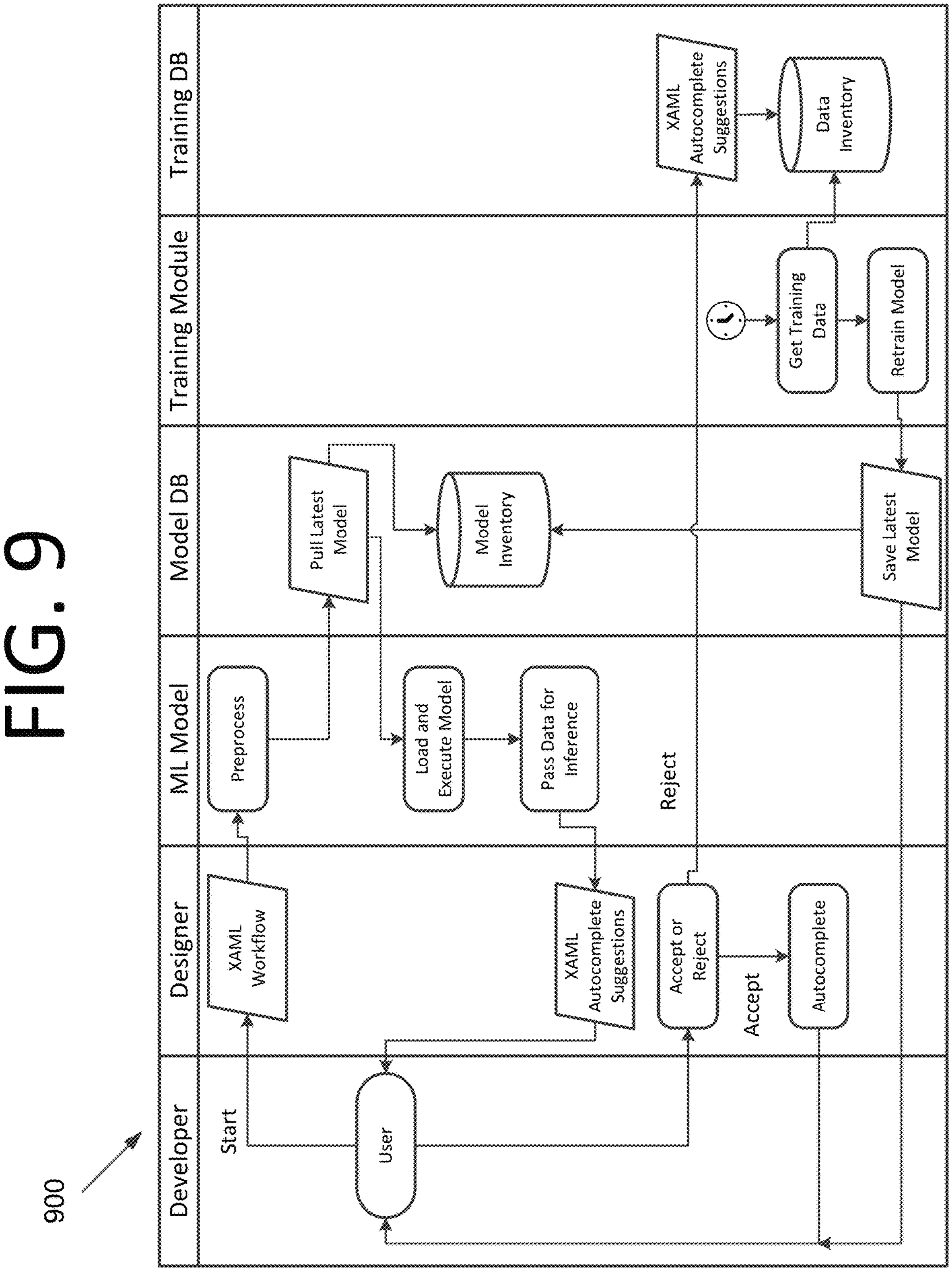
FIG. 9 is a flow diagram illustrating a process for rejecting or accepting and automatically completing a suggested next sequence of activities for an RPA workflow, according to an embodiment of the present invention.

FIG. 9 is a flow diagram illustrating a process 900 for rejecting or accepting and automatically completing a suggested next sequence of activities for an RPA workflow, according to an embodiment of the present invention. The process begins with a developer creating an RPA workflow in an RPA designer application, which the RPA designer application saves as an XAML workflow as the user adds and modifies activities in the RPA workflow. When the user adds or modifies an activity, the current XAML workflow is sent to an ML model for preprocessing. During preprocessing, the relevant data from the XAML file is extracted, and irrelevant data is stripped. In certain embodiments, the preprocessing may include adding or deriving relevant data for consideration by the ML model to further improve accuracy (e.g., adding more relevant metadata variables).

After preprocessing, the latest ML model is pulled from a model inventory database and the latest ML model is loaded and executed on the preprocessed data. Data resulting from the execution of the ML model is then passed for inference to the RPA designer application (e.g., XAML file(s) including the suggested next sequence(s) of activities), and the RPA designer application uses this data to display the suggestion(s) to the user/developer. In some embodiments, the confidence score(s) of the suggestion(s) are also passed to the RPA designer application to make the determination of whether to suggest the next sequence(s). However, in certain embodiments, if the suggestion confidence threshold is not met, suggestions may not be passed to the RPA designer application at all. If the user/developer then accepts a suggestion, the RPA developer application adds the next sequence of activities to the RPA workflow and the user/developer may then continue developing the RPA workflow.

If the user rejects the suggestion(s), the user may still continue developing the RPA workflow. However, the XAML of the rejected workflow is then sent to a data inventory database of XAML autocomplete suggestions that were rejected. In certain embodiments, accepted RPA workflows are also sent as positive examples for retraining. After some time passes, or when manually instructed to do so, a training module for training ML models pulls the rejected autocomplete suggestions (and potentially accepted positive examples) from the data inventory database and uses these to retrain the ML model (e.g., in accordance with process 700 of FIG. 7). Once retrained, this latest version of the ML model is then saved in the model inventory database to be used by the designer application.

Figure 10:
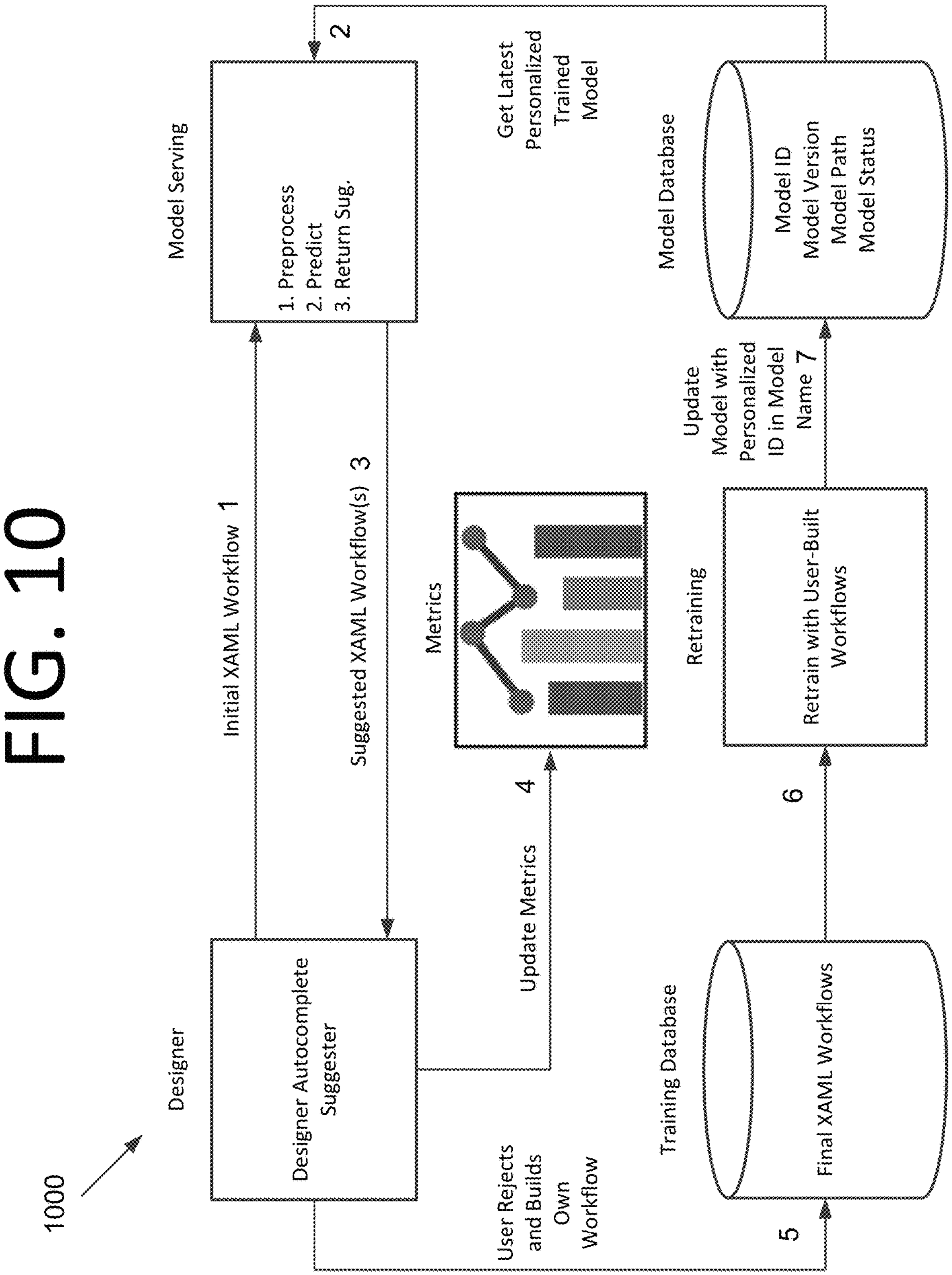
FIG. 10 is an autocompletion architectural diagram for both a personalized and generalized flow, according to an embodiment of the present invention.

FIG. 10 is an autocompletion architectural diagram 1000 for both a personalized and a generalized flow, according to an embodiment of the present invention. When a user starts developing the RPA workflow and after one or more activities are added to the RPA workflow, the initial XAML workflow is passed (1) from the RPA designer application to one or more retrieved (2) ML models to predict one or more potential next sequences of activities for suggestion to the user. In some embodiments, the pretrained ML models are personalized (local) and generalized (global). If the local ML model fails to find a sequence for suggestion that exceeds a suggestion confidence interval, the global ML model may be used. If no suggestions meet the suggestion confidence threshold, the designer application may continue to send XAML workflows as the user adds to and/or modifies the RPA workflow.

If one or more suggestions are provided (e.g., as XAML workflows), these are suggested (3) to the user in the designer application. Whether the user accepts or rejects the suggestion(s), and which suggestion was selected (if any), may be used to update metrics (4) pertaining to predicted activities (e.g., probability scores for given metrics) providing an indication as to how a given ML model is performing. If user rejects the suggested activity or sequence of activities, the user can continue to build his or her own RPA workflow. The designer application then continues to monitor the user's RPA workflow, and after completion thereof, sends the completed RPA workflow (5) to a training database as a feedback that will be used as training data in the future. In some embodiments, this data may be used to retrain the local ML model, the global ML model, or both.

At some point after storing the user's RPA workflow in the training database, the ML model(s) are retrained (6) (e.g., in accordance with process 700 of FIG. 7). If the suggestion confidence scores improve over the previously trained ML model(s), the newly trained ML model(s) will be considered as the latest best model and will be uploaded (7) to a model database to serve as the ML model(s) for future processing.

In some embodiments, when the RPA designer application is loaded, multiple ML models may be downloaded and used. For instance, a local ML model customized to the user and a global ML model trained using RPA workflows from multiple or many users may be loaded. The RPA designer application may first call the local ML model and see whether it returns any suggestions (e.g., one or more sequences met or exceeded a 90% suggestion confidence threshold). If so, the suggestion(s) may be provided to the user. If not, the global ML model may then be called to see whether one or more suggestions meet or exceed the suggestion confidence threshold.

Model details for the corresponding ML models (e.g., local and global) may be updated in separate tables in the model database in some embodiments. For instance, the model database may include fields such as model ID, model version, model path, model status, and/or any other suitable fields without deviating from the scope of the invention. Such fields may be provided when serving the respective ML model.

Figure 11:
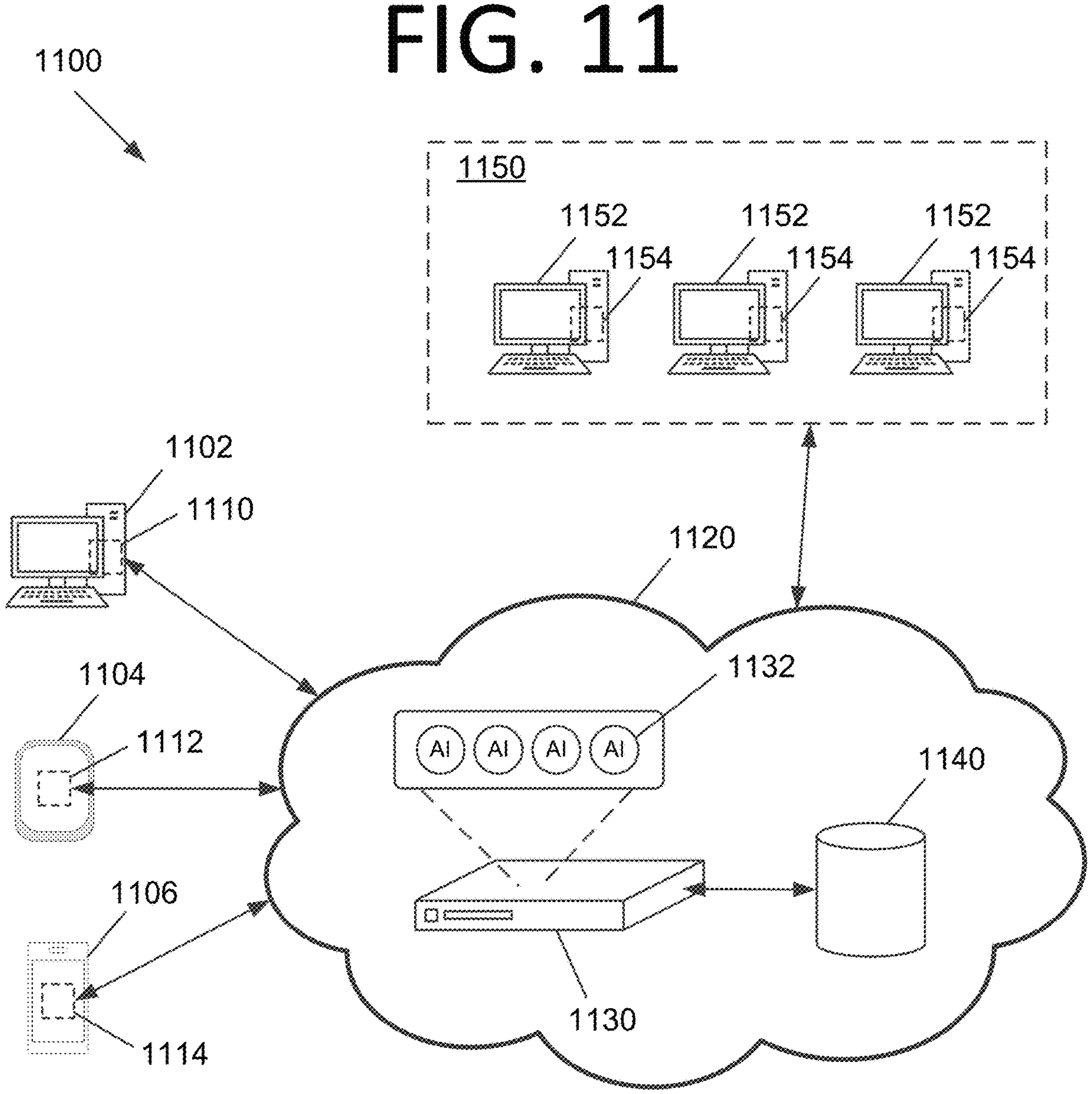
FIG. 11 is an architectural diagram illustrating a system configured to train and deploy AI/ML models that provide suggestions to automatically add to or complete RPA workflows, according to an embodiment of the present invention.

FIG. 11 is an architectural diagram illustrating a system 1100 configured to train and deploy AI/ML models that provide suggestions to automatically add to or complete RPA workflows, according to an embodiment of the present invention. System 1100 includes user computing systems, such as desktop computer 1102, tablet 1104, and smart phone 1106. However, any desired computing system may be used without deviating from the scope of invention including, but not limited to, smart watches, laptop computers, etc. Also, while three user computing systems are shown in FIG. 11, any suitable number of computing systems may be used without deviating from the scope of the invention. For instance, in some embodiments, dozens, hundreds, thousands, or millions of computing systems may be used.

Each computing system 1102, 1104, 1106 has a respective RPA robot 1110, 1112, 1114 executing an RPA automation that was designed by RPA developers of a development team 1150 using RPA designer applications 1154 running on respective RPA developer computing systems 1152. In some embodiments, RPA developer computing systems 1152 may be web-based and may provide web content to the RPA developer, who is operating another computing system that interacts with RPA developer computing system 1152. During development of the RPA workflow for use as an automation by RPA robots 1110, RPA designer applications 1154 call one or more AI/ML models 1132 by sending requests that include the RPA workflow in development via a network 1120 (e.g., a local area network (LAN), a mobile communications network, a satellite communications network, the Internet, any combination thereof, etc.) to a server 1130 hosting AI/ML models 1132. However, in some embodiments, a local ML model running on calling computing system 1152 is used first, as disclosed above.

In some embodiments, server 1130 may be part of a public cloud architecture, a private cloud architecture, a hybrid cloud architecture, etc. In certain embodiments, server 1130 may host multiple software-based servers on a single computing system 1130. In some embodiments, server 1130 may be implemented via one or more virtual machines (VMs).

Server 1130 provides the received RPA workflow as input to AI/ML models(s) 1132 and receives next sequence suggestion(s) and confidence score(s) therefrom. In some embodiments, server 1130 may only send sequence(s) that meet a suggestion confidence threshold to the calling RPA designer application 1154. However, in certain embodiments, server 1130 passes the suggestion(s) (e.g., RPA workflow(s) or portions thereof to be added) and the associated confidence score(s) to the calling RPA designer application 1154.

In some embodiments, a next sequence is accepted automatically if the associated confidence score meets an autocompletion threshold. Otherwise, the developer may then accept a suggestion if so desired or choose to reject all suggestions, or potentially reject an autocompletion. The accepted RPA workflows and those where suggestions were rejected and the developer provided a different implementation are sent to server 1130 and stored in database 1140. This information is then subsequently used to retrain AI/ML model(s) 1132 (e.g., in accordance with process 700 of FIG. 7), with the goal of making the retrained version of AI/ML model(s) 1132 more accurate.

Per the above, in some embodiments, multiple AI/ML models 1132 may be used. Each AI/ML model 1132 is an algorithm (or model) that runs on the data, and AI/ML models 1132 themselves may be a DLNN of trained artificial "neurons" that are trained in training data, for example. AI/ML models 1132 may be run in series, in parallel, or a combination thereof.

AI/ML models 1132 may include, but are not limited to, a sequence extraction model, a clustering detection model, a visual component detection model, a text recognition model (e.g., OCR), an audio-to-text translation model, or any combination thereof. However, any desired number and type(s) of AI/ML models may be used without deviating from the scope of the invention. Using multiple AI/ML models 1132 may allow the system to develop a global picture of what is happening in the RPA workflows. Patterns may be determined individually by an AI/ML model or collectively by multiple AI/ML models.

Figure 12:
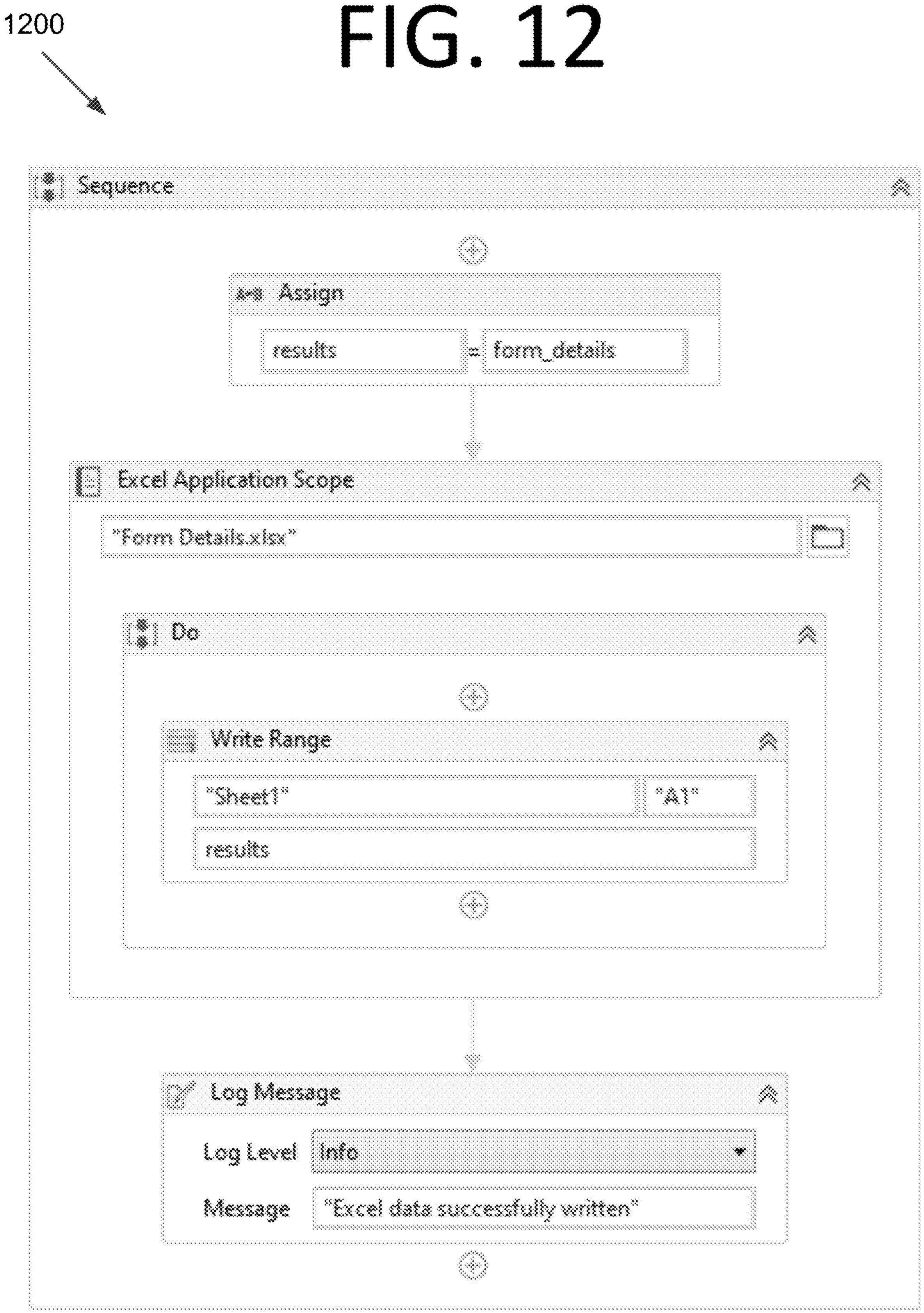
FIG. 12 illustrates an example RPA workflow, according to an embodiment of the present invention.

FIG. 12 illustrates an example of RPA workflow 1200, according to an embodiment of the present invention. RPA workflow 1200 writes data from SAP® into an Excel® spreadsheet and provides a log message, if successful. FIGS. 13A and 13B illustrate a first part 1300 and a second part 1310 of the XAML in an RPA designer application that has been prepared based on activities added and configured by an RPA developer up to a certain point in developing RPA workflow 1200. FIGS. 14A and 14B illustrate a first part 1400 and a second part 1410 of the XAML for RPA workflow 1200 with XAML 1412 for a predicted next suitable activity highlighted in grey. The trained AI/ML model would provide prediction 1412 based on the other components that are present in RPA workflow 1200 up to that point.

An example of a Main.xaml for UiPath Studio™ including files used to train the AI/ML model in an embodiment is provided below.

```
<Activity mc:Ignorable="sap sap2010" x:Class="Main"
mva:VisualBasic.Settings="{x:Null}"
sap:VirtualizedContainerService.HintSize="824,680.8"
sap2010:WorkflowViewState.IdRef="ActivityBuilder_1"
xmlns="http://schemas.microsoft.com/netfx/2009/xaml/activities"
xmlns:mc="http://schemas.openxmlformats.org/markup-compatibility/2006"
xmlns:mva="clr-
namespace:Microsoft.VisualBasic.Activities;assembly-System.Activities"
xmlns:sap="http://schemas.microsoft.com/netfx/2009/xaml/activities/presentation"
xmlns:sap2010="http://schemas.microsoft.com/netfx/2010/xaml/activities/presentation
" xmlns:scg="clr-namespace:System.Collections.Generic;assembly=mscorlib"
xmlns:sd="clr-namespace:System.Data;assembly=System.Data"
xmlns:ui="http://schemas.uipath.com/workflow/activities"
xmlns:x="http://schemas.microsoft.com/winfx/2006/xaml">
  <TextExpression.NamespacesForImplementation>
    <scg:List x:TypeArguments="x:String" Capacity="28">
      <x:String>System.Activities</x:String>
      <x:String>System.Activities.Statements</x:String>
      <x:String>System.Activities.Expressions</x:String>
      <x:String>System.Activities.Validation</x:String>
      <x:String>System.Activities.XamlIntegration</x:String>
      <x:String>Microsoft.VisualBasic</x:String>
      <x:String>Microsoft.VisualBasic.Activities</x:String>
      <x:String>System</x:String>
      <x:String>System.Collections</x:String>
      <x:String>System.Collections.Generic</x:String>
      <x:String>System.Data</x:String>
      <x:String>System.Diagnostics</x:String>
      <x:String>System.Drawing</x:String>
      <x:String>System.IO</x:String>
      <x:String>System.Linq</x:String>
      <x:String>System.Net.Mail</x:String>
      <x:String>System.Xml</x:String>
      <x:String>System.Xml.Linq</x:String>
      <x:String>UiPath.Core</x:String>
      <x:String>UiPath.Core.Activities</x:String>
      <x:String>System.Windows.Markup</x:String>
      <x:String>System.Collections.ObjectModel</x:String>
      <x:String>System.Activities.DynamicUpdate</x:String>
      <x:String>UiPath.Excel</x:String>
      <x:String>UiPath.Excel.Activities</x:String>
      <x:String>System.ComponentModel</x:String>
      <x:String>System.Runtime.Serialization</x:String>
      <x:String>System.Xml.Serialization</x:String>
    </scg:List>
  </TextExpression.NamespacesForImplementation>
  <TextExpression.ReferencesForImplementation>
    <scg:List x:TypeArguments="AssemblyReference" Capacity="21">
      <AssemblyReference>System.Activities</AssemblyReference>
      <AssemblyReference>Microsoft.VisualBasic</AssemblyReference>
      <AssemblyReference>mscorlib</AssemblyReference>
      <AssemblyReference>System.Data</AssemblyReference>
      <AssemblyReference>System</AssemblyReference>
      <AssemblyReference>System.Drawing</AssemblyReference>
      <AssemblyReference>System.Core</AssemblyReference>
      <AssemblyReference>System.Xml</AssemblyReference>
      <AssemblyReference>System.Xml.Linq</AssemblyReference>
      <AssemblyReference>PresentationFramework</AssemblyReference>
```

-continued

```
        <AssemblyReference>WindowsBase</AssemblyReference>
        <AssemblyReference>PresentationCore</AssemblyReference>
        <AssemblyReference>System.Xaml</AssemblyReference>
        <AssemblyReference>UiPath.System.Activities</AssemblyReference>
        <AssemblyReference>UiPath.UiAutomation.Activities</AssemblyReference>
        <AssemblyReference>System.Data.DataSetExtensions</AssemblyReference>
        <AssemblyReference>UiPath.Excel.Activities.Design</AssemblyReference>
        <AssemblyReference>UiPath.Excel.Activities</AssemblyReference>
        <AssemblyReference>UiPath.Excel</AssemblyReference>
        <AssemblyReference>System.Runtime.Serialization</AssemblyReference>
        <AssemblyReference>UiPath.System.Activities.Design</AssemblyReference>
      </scg:List>
    </TextExpression.ReferencesForImplementation>
    <Sequence sap:VirtualizedContainerService.HintSize="475.2,616"
sap2010:WorkflowViewState.IdRef="Sequence_1">
      <Sequence.Variables>
        <Variable x:TypeArguments="sd:DataTable" Name="results" />
        <Variable x:TypeArguments="sd:DataTable" Name="form_details" />
      </Sequence.Variables>
      <sap:WorkflowViewStateService.ViewState>
        <scg:Dictionary x:TypeArguments="x:String, x:Object">
          <x:Boolean x:Key="IsExpanded">True</x:Boolean>
        </scg:Dictionary>
      </sap:WorkflowViewStateService.ViewState>
      <Assign sap:VirtualizedContainerService.HintSize="433.6,60"
sap2010:WorkflowViewState.IdRef="Assign_1">
        <Assign.To>
          <OutArgument x:TypeArguments="sd:DataTable">[results]</OutArgument>
        </Assign.To>
        <Assign.Value>
          <InArgument x:TypeArguments="sd:DataTable">[form_details]</InArgument>
        </Assign.Value>
      </Assign>
      <ui:ExcelApplicationScope Password="{x:Null}" DisplayName="Excel
Application Scope" sap:VirtualizedContainerService.HintSize="433.6,290.4"
sap2010:WorkflowViewState.IdRef="ExcelApplicationScope_1"
InstanceCachePeriod="3000" WorkbookPath="Form Details.xlsx">
        <ui:ExcelApplicationScope.Body>
          <ActivityAction x: TypeArguments="ui:WorkbookApplication">
            <ActivityAction.Argument>
              <DelegateInArgument x:TypeArguments="ui:WorkbookApplication"
Name="ExcelWorkbookScope" />
            </ActivityAction.Argument>
            <Sequence DisplayName="Do"
sap:VirtualizedContainerService.HintSize="375.2,180.8"
sap2010:WorkflowViewState.IdRef="Sequence_2">
              <sap:WorkflowViewStateService.ViewState>
                <scg:Dictionary x:TypeArguments="x:String, x:Object">
                  <x:Boolean x:Key="IsExpanded">True</x:Boolean>
                </scg:Dictionary>
              </sap:WorkflowViewStateService.ViewState>
              <ui:ExcelWriteRange AddHeaders="False" DataTable="[results]"
DisplayName="Write Range" sap:VirtualizedContainerService.HintSize="333.6,88"
sap2010:WorkflowViewState.IdRef="ExcelWriteRange_1" SheetName="Sheet1"
StartingCell="A1" />
            </Sequence>
          </ActivityAction>
        </ui:ExcelApplicationScope.Body>
      </ui:ExcelApplicationScope>
      <ui:LogMessage DisplayName="Log Message"
sap:VirtualizedContainerService.HintSize="433.6,92.8"
sap2010:WorkflowViewState.IdRef="LogMessage_1" Level="Info"
Message="[&quot;Excel data successfully written&quot;]" />
    </Sequence>
</Activity>
```

Such XAML files may be provided for various RPA workflows being developed by RPA developers, per the above. The AI/ML model may use these examples to be trained to recognize patterns and provide next sequence suggestions. Once in production use, more data may be collected as described above, and the AI/ML model may be retrained to improve its accuracy, local AI/ML models may be generated to accommodate individual user preferences, etc.

Figure 15:
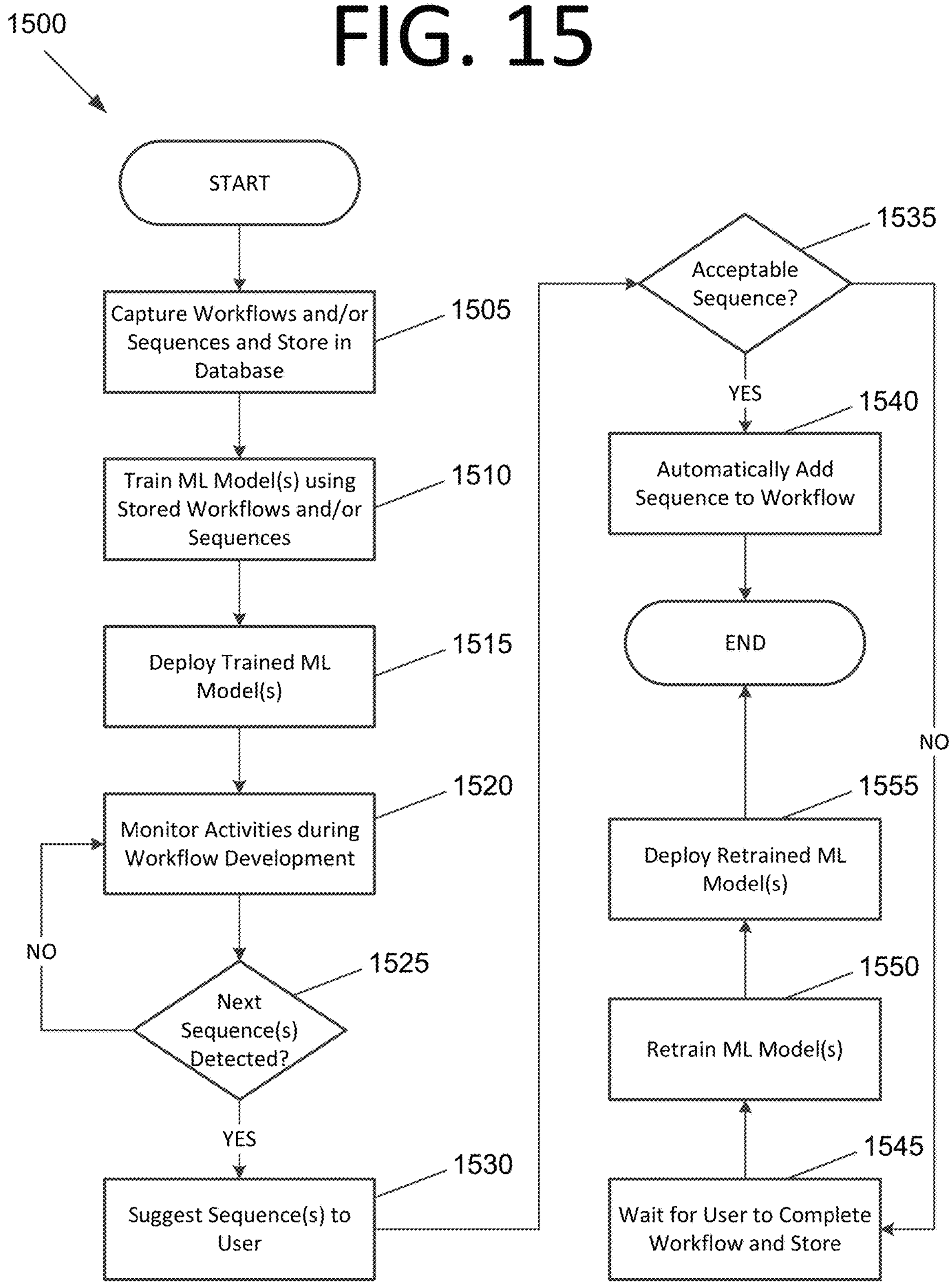
FIG. 15 is a flowchart illustrating a process for using AI/ML models to automatically supplement and/or complete RPA workflows, according to an embodiment of the present invention.

FIG. 15 is a flowchart illustrating a process 1500 for automatically completing RPA workflows using ML, according to an embodiment of the present invention. The process begins with capturing created RPA workflows, sequences of activities in the created RPA workflows, or both, by an RPA designer application and storing them in a database at 1505. In some embodiments, the RPA workflows, sequences of activities, or both, may be in XAML format, JSON format, etc. The stored RPA workflows, sequences of activities, or both, are then used to train one or more ML models at 1510. The trained ML model(s) are then deployed to user computing systems or otherwise made available to users at 1515.

Once deployed or made available, the RPA designer application monitors user activities during RPA workflow development and provides these to at least one of the one or more ML models at 1520 (e.g., as XAML, JSON, etc.). In some embodiments, multiple ML models may be called and executed in series if a previously executed ML model does not detect a next sequence of activities. If the ML model(s) do not detect one or more potential next sequences of activities meeting or exceeding a suggestion confidence threshold at 1525 (e.g., as determined on the server side or by the RPA designer application itself based on the confidence score(s) for the suggestion(s)), the process returns to step 1520. However, if one or more potential next sequences of activities meeting or exceeding the suggestion confidence threshold are detected at 1525, the sequence(s) are suggested to the user at 1530.

If the user accepts the suggestion or if the sequence exceeds a second, higher autocompletion threshold that does not require user selection at 1535, the suggested sequence of activities is automatically added to the RPA workflow at 1540. However, if the user rejects the suggestion at 1535, the RPA designer application waits for the user to complete the RPA workflow and then causes the completed RPA workflow to be stored at 1545 (e.g., by sending the completed RPA workflow to a cloud RPA system). The completed RPA workflow and potentially some or many other completed RPA workflows including negative examples (and potentially positive examples) are then used to retrain the ML model(s) at 1550, and the retrained ML model(s) are deployed or made available at 1555.

The process steps performed in FIG. 15 may be performed by a computer program, encoding instructions for the processor(s) to perform at least part of the process(es) described in FIG. 15, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 15, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearance of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. One or more computing systems, comprising:

memory storing computer program instructions; and at least one processor configured to execute the computer program instructions, that least one processor communicably coupled to the memory, wherein the computer program instructions are configured to cause the at least one processor to:

receive a captured sequence of activities from a robotic process automation (RPA) designer application of a developer computing system over a communication network, provide the captured sequence of activities to one or more artificial intelligence (AI)/machine learning (ML) models as an input to the one or more AI/ML models, the one or more AI/ML models trained using other previously captured sequences of activities, the one or more AI/ML models trained based on different automations built by a plurality of users other than a user of the developer computing system, the different automations comprising activities and parameters used to create workflows for the different automations, execute the one or more AI/ML models, receive one or more suggested next sequences of activities and one or more respective confidence scores as an output from the one or more AI/ML models, and responsive to the one or more suggested next sequences of activities and the one or more respective confidence scores exceeding a suggestion confidence threshold, transmit the one or more suggested next sequences of activities to the developer computing system, the one or more next sequences of activities comprising declarations and variable usage set by the one or more AI/ML models, wherein the developer computing system is configured to display the one or more suggested next sequences of activities via an electronic display.

2. The one or more computing systems of claim 1, wherein the one or more computing systems or one or more retraining servers are configured to retrain the one or more trained AI/ML models after a predetermined period of time has passed, after a predetermined amount of data has been collected since a last training of the one or more trained AI/ML models, after a predetermined number of users have automatically completed RPA workflows, after a predetermined number or percentage of users have rejected suggestions from the one or more trained AI/ML models, or any combination thereof.

3. The one or more computing systems of claim 1, wherein during training, the one or more trained AI/ML models learn user-specific style, logic, conventions, or any combination thereof, as a user develops RPA workflows over time.

4. The one or more computing systems of claim 1, wherein the one or more trained AI/ML models are configured to:

detect that one or more added and/or modified activities within the RPA designer application are indicative of a next sequence of activities based on the RPA workflow as input as the user adds and/or modifies the activities in the RPA workflow, the detection based on running parameters of the RPA workflow through the one or more trained AI/ML models and producing a sequence of next steps and a suggestion confidence threshold as an output.

5. The one or more computing systems of claim 1, wherein the one or more respective suggestion confidence thresholds are probabilistic thresholds based on confidence scores learned during the training of the one or more trained AI/ML models.

6. The one or more computing systems of claim 1, wherein the one or more trained AI/ML models comprise a local AI/ML model and a global AI/ML model, the RPA designer application is configured to call the local AI/ML model first, responsive to the local AI/ML model suggesting one or more next sequences of activities that meet or exceed the suggestion confidence threshold, the RPA designer application is configured to display the one or more next sequences of activities from the local AI/ML model to the user, and responsive to the local AI/ML model not suggesting at least one next sequences of activities that meet or exceed the suggestion confidence threshold, the RPA designer application is configured to call the global AI/ML model via the model serving server.

7. The one or more computing systems of claim 6, wherein the local AI/ML model and the global AI/ML model utilize different suggestion confidence thresholds.

8. The one or more computing systems of claim 1, wherein when a first AI/ML model of the one or more trained AI/ML models does not provide a suggestion of at least one next sequence of activities meeting or exceeding the suggestion confidence threshold, the RPA designer application is configured to call a second AI/ML model of the one or more trained AI/ML models, a third AI/ML model of the one or more trained AI/ML models, and so on, and the one or more computing systems are configured to receive and process the AI/ML model calls, until at least one next sequence of activities meeting or exceeding the suggestion confidence threshold has been found or all of the one or more trained AI/ML models have been called without identifying at least one next sequence of activities meeting or exceeding the suggestion confidence threshold.

9. The one or more computing systems of claim 1, wherein the one or more trained AI/ML models are trained using attended user feedback, unattended user feedback, or both.

10. One or more non-transitory computer-readable media storing one or more computer programs, the one or more computer programs configured to cause at least one processor to:

monitor activities and capture a sequence of activities in a robotic process automation (RPA) workflow, the captured sequence of activities comprising one or more activities that have been added to and/or modified in the RPA workflow by a user of a developer computing system;

send the captured sequence of activities to one or more computing systems via a communications network;

receive one or more suggested next sequences of activities from one or more respective confidence scores as an output from one or more trained AI/ML models via the one or more computing systems over the communications network, the one or more AI/ML models trained using other previously captured sequences of activities based on different automations built by a plurality of users other than a user of the developer computing system, the different automations comprising activities and parameters used to create workflows for the different automations, the one or more next sequences of activities comprising declarations and variable usage set by the one or more AI/ML models; and display the one or more suggested next sequences of activities to the user via an electronic display.

11. The one or more non-transitory computer-readable media of claim 10, wherein the one or more trained AI/ML models are configured to:

detect that one or more activities within the RPA designer application that have added and/or modified by the user are indicative of a next sequence of activities based on the RPA workflow as input as the user adds and/or modifies the activities in the RPA workflow, the detection based on running parameters of the RPA workflow through the one or more trained AI/ML models and producing a sequence of next steps and a suggestion confidence threshold as an output.

12. The one or more non-transitory computer-readable media of claim 10, wherein after the one or more computer programs display the one or more suggested next sequences of activities, when the user provides confirmation in the RPA designer application that a sequence of the one or more suggested next sequences of activities is correct, the one or more computer programs are configured to automatically add the next sequence of activities to the RPA workflow.

13. The one or more non-transitory computer-readable media of claim 12, wherein the automatically adding of the next sequence of activities to the workflow comprises setting declarations and usage of variables, setting properties, reading from and/or writing to files, or any combination thereof.

14. The one or more non-transitory computer-readable media of claim 10, wherein when one or more sequences of the suggested next sequences of activities meets or exceeds an automatic completion confidence threshold that is higher than the respective suggestion confidence threshold, the one or more computer programs are configured to automatically add a sequence of the one or more suggested next sequences of activities that meets or exceeds the automatic completion confidence threshold with a highest confidence score.

15. The one or more non-transitory computer-readable media of claim 10, wherein after the one or more trained AI/ML models suggest the next sequence of activities, responsive to the user providing an indication in the RPA designer application that the one or more next sequences of activities are incorrect, the one or more computer programs are configured to cause the RPA workflow to be stored in a database as a negative example for subsequent retraining of the one or more trained AI/ML models after the user completes the RPA workflow.

16. The one or more non-transitory computer-readable media of claim 10, wherein the one or more trained AI/ML models comprise a local AI/ML model and a global AI/ML model, the one or more computer programs are configured to call the local AI/ML model first, responsive to the local AI/ML model suggesting one or more next sequences of activities that meet or exceed the suggestion confidence threshold, the one or more computer programs are configured to display the one or more next sequences of activities from the local AI/ML model to the user, and responsive to the local AI/ML model not suggesting at least one next sequences of activities that meet or exceed the suggestion confidence threshold, the one or more computer programs are configured to call the global AI/ML model via the model serving server.

17. The one or more non-transitory computer-readable media of claim 10, wherein responsive to a first AI/ML model of the one or more trained AI/ML models not providing a suggestion of at least one next sequence of activities meeting or exceeding the suggestion confidence threshold, the one or more computer programs are configured to call a second AI/ML model of the one or more trained AI/ML models, a third AI/ML model of the one or more trained AI/ML models, and so on until at least one next sequence of activities meeting or exceeding the suggestion confidence threshold has been found or all of the one or more trained AI/ML models have been called without identifying at least one next sequence of activities meeting or exceeding the suggestion confidence threshold.

18. One or more model serving computing systems, comprising:

memory storing computer program instructions; and at least one processor configured to execute the computer program instructions, wherein the computer program instructions are configured to cause the at least one processor to:

receive a captured sequence of activities in a robotic process automation (RPA) workflow under development from an RPA designer application of a developer computing system via a communications network, provide the captured sequence of activities as input to one or more trained artificial intelligence (AI)/machine learning (ML) models, the one or more AI/ML models trained using other previously captured sequences of activities based on different automations built by a plurality of users other than a user of the developer computing system, the different automations comprising activities and parameters used to create workflows for the different automations, receive one or more suggested next sequences of activities and respective confidence scores as an output from the one or more trained AI/ML models, and send the one or more suggested next sequences of activities to the RPA designer computing system via the communications network, the one or more next sequences of activities comprising declarations and variable usage set by the one or more AI/ML models, wherein the developer computing system is configured to display the one or more suggested next sequences of activities via an electronic display.

19. The one or more model serving computing systems of claim 18, wherein during training, the one or more trained AI/ML models learn user-specific style, logic, conventions, or any combination thereof, as a user develops RPA workflows over time.

20. The one or more model serving computing systems of claim 18, wherein the one or more trained AI/ML models are configured to:

detect that one or more of the added and/or modified activities within the RPA designer application are indicative of a next sequence of activities based on the RPA workflow as input as the user adds and/or modifies the activities in the RPA workflow, the detection based on running parameters of the RPA workflow through the one or more trained AI/ML models and producing a sequence of next steps and a suggestion confidence threshold as an output.

* * * * *